(12) United States Patent
Mooney et al.

(10) Patent No.: US 8,456,969 B1
(45) Date of Patent: Jun. 4, 2013

(54) LASER INTEGRATED RECORDING HEAD FOR HEAT ASSISTED MAGNETIC RECORDING

(75) Inventors: Marcus Benedict Mooney, Donegal (IE); Mark Anthony Gubbins, Donegal (IE); Roger Lee Hipwell, Eden Prairie, MN (US); Michael Allen Seigler, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/431,163

(22) Filed: Mar. 27, 2012

(51) Int. Cl.
*G11B 11/00* (2006.01)

(52) U.S. Cl.
USPC ............... 369/13.33; 369/13.13; 369/112.27

(58) Field of Classification Search
USPC .......... 369/13.33, 13.32, 13.24, 13.14, 13.03, 369/13.02, 13.12, 13.13, 13.01, 13.35, 13.17, 369/112.27, 112.09; 360/59, 125.31, 125.74
See application file for complete search history.

(56) References Cited

U.S. PATENT DOCUMENTS

| | | | |
|---|---|---|---|
| 5,742,459 A | 4/1998 | Shen et al. | |
| 6,771,589 B2 | 8/2004 | Ueyanagi et al. | |
| 6,834,027 B1 | 12/2004 | Sakaguchi et al. | |
| 6,944,112 B2 | 9/2005 | Challener | |
| 7,228,619 B2 | 6/2007 | Le | |
| 7,310,205 B2 | 12/2007 | Hsu et al. | |
| 7,483,229 B2 | 1/2009 | Rausch et al. | |
| 7,586,583 B2 | 9/2009 | Schellenberg et al. | |
| 7,643,248 B2 | 1/2010 | Sluzewski | |
| 7,839,497 B1 | 11/2010 | Rausch et al. | |
| 7,869,309 B2 | 1/2011 | Mihalcea et al. | |
| 8,014,434 B2 * | 9/2011 | Behfar et al. | 372/96 |
| 8,179,747 B1 * | 5/2012 | Mugino et al. | 369/13.33 |
| 8,254,212 B2 * | 8/2012 | Snyder et al. | 369/13.33 |
| 2009/0067465 A1 | 3/2009 | Behfar et al. | |
| 2010/0328807 A1 | 12/2010 | Snyder et al. | |
| 2011/0243176 A1 | 10/2011 | Mooney et al. | |
| 2012/0147718 A1 * | 6/2012 | Hellwig et al. | 369/13.33 |

FOREIGN PATENT DOCUMENTS

| | | |
|---|---|---|
| WO | WO9722967 | 6/1997 |
| WO | WO2008143635 | 11/2008 |
| WO | WO2010011713 | 1/2010 |
| WO | WO2010059781 | 5/2010 |
| WO | WO2010111601 | 9/2010 |
| WO | WO2011011141 | 1/2011 |

OTHER PUBLICATIONS

Bain et al., "The Effect of Substrate Temperature on the Magnetic Properties of FeAlN Thin Films for Recording Heads", IEEE Transactions on Magnetics, vol. 31, No. 6, Nov. 1995, pp. 2703-2705.
Stipe et al., "Magnetic Recording at 1.5 Pb m -2 Using an Integrated Plasmonic Antenna", Nature Photonics, vol. 4, Jul. 2010, pp. 484-488.

* cited by examiner

*Primary Examiner* — Ali Neyzari
(74) *Attorney, Agent, or Firm* — Hollingsworth Davis, LLC

(57) ABSTRACT

A magnetic stack includes a self-supporting substrate that carries first and second layer(s). The first layer(s) comprise a magnetic write pole, and the second layer(s) comprise a semiconductor laser. At least one of the second layer(s) is monocrystalline and incompatible with epitaxial growth on the substrate. No support substrate other than the self-supporting substrate attaches to the second layer(s). The magnetic stack may include a near field transducer (NFT) disposed to receive light emitted by the laser. A waveguide may transmit light from the laser to the NFT, or the NFT may couple to the laser without an intervening waveguide. The magnetic stack may be configured for heat assisted magnetic recording (HAMR).

23 Claims, 19 Drawing Sheets

LASER INTEGRATED RECORDING HEAD FOR HEAT ASSISTED MAGNETIC RECORDING

BACKGROUND

This invention relates generally to recording technology, with particular application to heat assisted magnetic recording (HAMR), and to associated articles, systems, and methods. A HAMR device may be used in a hard disk drive that includes a magnetic recording medium adapted to overcome superparamagnetic effects that might otherwise limit the areal data density of other types of magnetic media. In order to record information in this medium, the HAMR device may locally heat a small portion of the recording medium which is also exposed to a magnetic write field of a selected polarity generated by a magnetic write head. The local heating provided by the HAMR device allows the small portion of the recording medium to take on a magnetization that is the same polarity as the magnetic write field, while neighboring portions of the recording medium adjacent to the small portion may have respective magnetizations that are not changed even though the magnetic write field extends to those neighboring portions. As a technique for locally heating the small portion of the recording medium, others have proposed different combinations of a laser light source and a component known alternatively as a plasmonic antenna, a plasmonic transducer, or a near field transducer. Such component is referred to as a near field transducer, which is abbreviated herein as "NFT". The NFT converts some of the power from the laser light into a hot spot whose transverse dimensions are smaller than the diffraction-limited spot size for the laser light, provided the magnetic recording medium is located close enough to the NFT.

BRIEF SUMMARY

The present application discloses, inter alia, a magnetic stack that includes first layer(s), second layer(s), a self-supporting substrate, and a near-field transducer (NFT). The first layer(s) are patterned to provide a magnetic write pole, and the second layer(s) are patterned to provide a semiconductor laser. The substrate carries the magnetic write pole and the laser. The NFT is disposed to receive light generated by the laser. At least one of the second layer(s) is monocrystalline and incompatible with epitaxial growth on the substrate, and no support substrate other than the self-supporting substrate attaches to the second layer(s). The second layer(s) may not be self-supporting, e.g., they may have a collective thickness of less than 50, or 20, or 10 micrometers, for example, they may have a collective thickness of about 5 micrometers depending on the configuration. Similarly, the first layer(s) may not be self-supporting, e.g., they may have a collective thickness of less than 50, or 20, or micrometers. The magnetic stack may be configured for heat assisted magnetic recording (HAMR).

The application also discloses articles that include a self-supporting wafer substrate having a plurality of non-self-supporting layers formed thereon, the plurality of non-self-supporting layers comprising first layer(s) and second layer(s). Furthermore, multiple write pole structures are formed by the first layer(s) in corresponding multiple regions of the wafer. Such articles further include at least one semiconductor laser formed by the second layer(s) in each of the multiple regions of the wafer, and at least one of the second layer(s) is monocrystalline and incompatible with epitaxial growth on the wafer substrate.

The application also discloses methods of making devices, such methods including: providing a first wafer comprising a first self-supporting wafer substrate; forming a write pole structure on the first wafer; providing a second self-supporting wafer comprising a monocrystalline wafer substrate and an epitaxial layer compatible with epitaxial growth on the monocrystalline wafer substrate; transferring at least a portion of the epitaxial layer from the monocrystalline wafer substrate to the first wafer substrate to produce a structure in which the at least a portion of the epitaxial layer is attached to the first wafer substrate but not attached to the monocrystalline wafer substrate; and forming a semiconductor laser on the first wafer substrate utilizing the at least a portion of the epitaxial layer.

Related methods, systems, and articles are also discussed. Magnetic stacks discussed herein are alternatively referred to as a "heads", to the extent they may be used as a read head, write head, or read/write head for recording such as heat assisted magnetic recording.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

In the figures, like reference numerals designate like elements.

DETAILED DESCRIPTION OF ILLUSTRATIVE EMBODIMENTS

Figure 1:
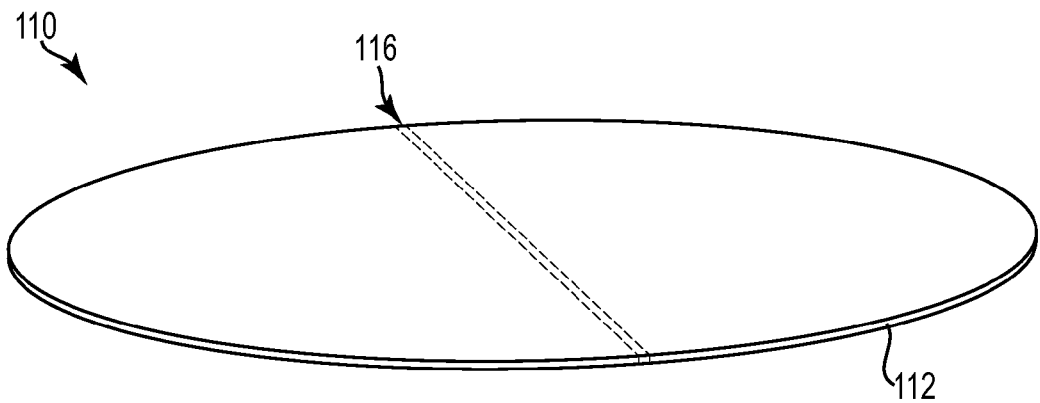
FIG. 1 is a perspective schematic view of a wafer article in which one or more magnetic devices and one or more laser devices have been formed in each of a plurality of regions of the wafer.

We have developed heads such as recording heads in which a semiconductor laser is incorporated into the head along with one or more magnetic devices such as a magnetic write pole, but where the semiconductor laser is itself non-self supporting and is physically carried by same substrate that carries the one or more magnetic devices, without the use of a separate or intermediate support substrate to also physically carry the semiconductor laser. Carrying the semiconductor laser with the same substrate that carries the one or more magnetic devices, without a separate or intermediate support substrate, can help to reduce the size and weight of the head, and it can also allow for the use of laser geometries and designs that are very different from simple edge-emitting cleaved facet lasers that have been proposed in the past. In at least some cases, the laser is incompatible with epitaxial growth on the substrate, but the laser may nevertheless be formed on the substrate by transferring a thin, non-self-supporting crystalline layer (epitaxial layer), or a stack of such layers, from a growth substrate on which they were formed to a target substrate, and then forming the laser by further processing of the epitaxial layer(s). The target substrate may be a substrate that will later be diced or otherwise subdivided to produce recording heads. Forming the laser on the target substrate may include etching one or more of the epitaxial layers formed on the seed layer. In some cases, the etching procedure produces an etched light-emitting facet of the laser. The target substrate may be or comprise a composite material such as AlTiC that comprises aluminum oxide and titanium carbide, and the thin crystalline seed layer may be or comprise gallium arsenide (GaAs), including alloys thereof. The substrate may be shaped to form an air bearing surface, and the head may also include other devices such as an NFT disposed at the air bearing surface to convert some of the laser light into a hot spot in a volume of space occupied by a medium spaced apart from the head, the hot spot having transverse dimensions smaller than a diffraction-limited spot size for the laser light.

Semiconductor lasers may be incorporated into a head such as a recording head to provide coherent light to a plasmonic transducer for heat assisted magnetic recording (HAMR) or optical magnetic recording. Optical energy from the laser may be used indirectly to locally heat a suitable recording medium in order to reduce coercivity of the medium so that an applied magnetic field can more easily change the magnetization of the recording medium during the temporary magnetic softening of the medium caused by the heating. The size of the locally heated portion of the recording medium may be used to determine the data bit dimension. Optical energy from the laser is typically coupled into a waveguide and directed towards an NFT, which converts the optical energy to electromagnetic energy in a tightly confined spot close to an output end of the NFT. In some embodiments discussed below, however, the waveguide may be omitted. Assuming the head is disposed sufficiently close to the recording medium, the power density in the confined spot can heat a corresponding small spot of the recording medium to reduce the coercivity of the small heated portion. While still heated, the small portion may be exposed to a magnetic field that sets or controls the direction of magnetization of the heated portion. In this manner the coercivity of the medium at ambient temperature can be much higher than the coercivity during recording, thus allowing for stability of the recorded bits at much higher storage densities and with much smaller bit cells.

In one possible approach, a finished semiconductor laser can be fabricated completely separate from the recording head, and the recording head can be made to include a waveguide and NFT. The finished semiconductor laser, in chip form and still attached to the self-supporting wafer substrate on which it was grown, may then be bonded or otherwise attached to the recording head and aligned thereon so that laser light couples to the waveguide and the NFT. The laser chip mechanically couples to the recording head "piggyback" style, forming a hybrid recording head sometimes referred to as a "laser on slider". In this approach, the output facet of the semiconductor laser is made by mechanically cleaving the processed wafer to create an output facet on the laser chip.

The foregoing approach may have cost and complexity issues in fabrication due to the alignment and bonding procedures that are carried out for each individual laser chip and hybrid recording head. Furthermore, the hybrid recording head may have an excessive size and mass as a result of the relatively large size of the laser chip, which in turn results from the presence of the relatively thick self-supporting wafer that accompanies the laser.

Alternative techniques for incorporating semiconductor lasers into heads such as hybrid recording heads are disclosed herein. These alternative techniques may, in at least some cases, overcome one or more of the disadvantages mentioned in the preceding paragraph. Furthermore, these alternative techniques may facilitate the use of semiconductor laser designs that would otherwise not be possible or feasible. Such alternative laser designs may incorporate a laser output facet that is etched rather than cleaved. In many cases, these alternative techniques involve removal of a non-self-supporting epitaxial layer stack or layer from the support wafer on which it was formed, and transfer of at least a portion of that epitaxial layer stack to another substrate on which a magnetic write element, a magnetic read element, a waveguide, and/or an NFT has been and/or will be formed. Such removal and transfer can be carried out, for reduced cost and/or complexity in fabrication, on a wafer scale rather than on only one recording head at a time, where the wafer may incorporate a multitude of devices arranged in an array, and a corresponding multitude of individual recording heads can be made from such a wafer by dicing and polishing operations, for example.

Figure 2:
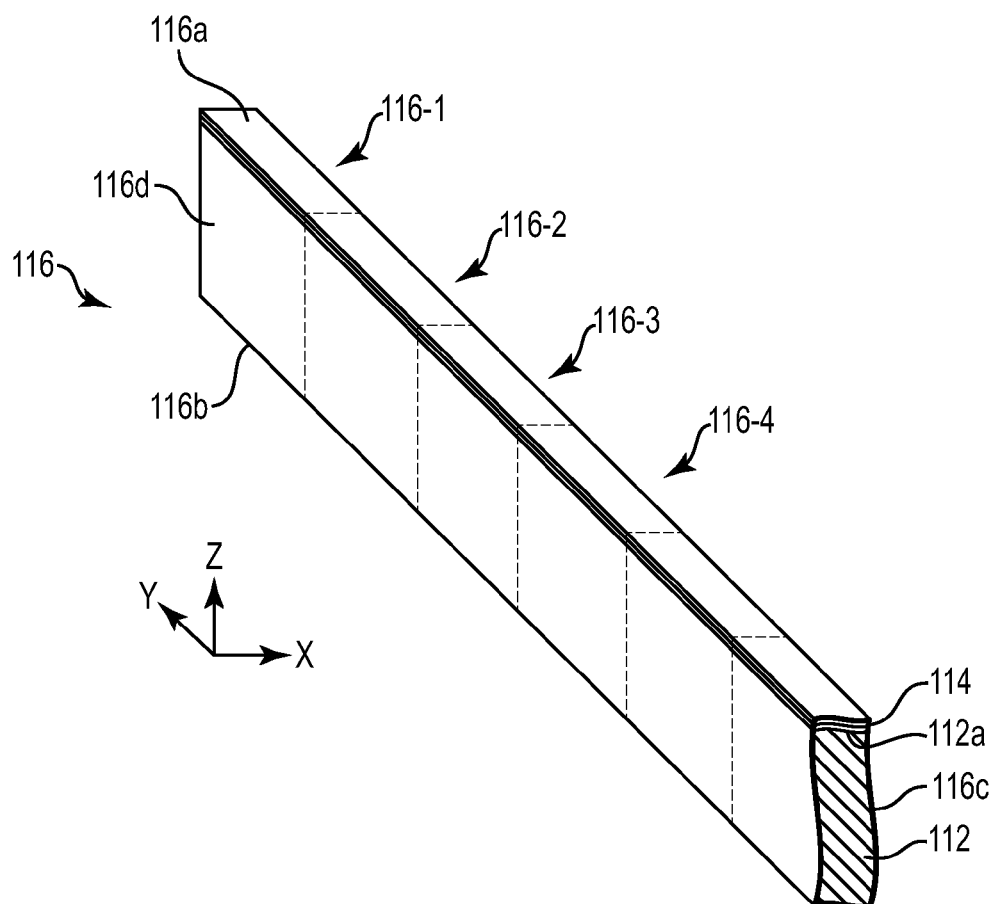
FIG. 2 is a perspective schematic view of an elongated section or bar of the wafer article of FIG. 1.
Figure 3:
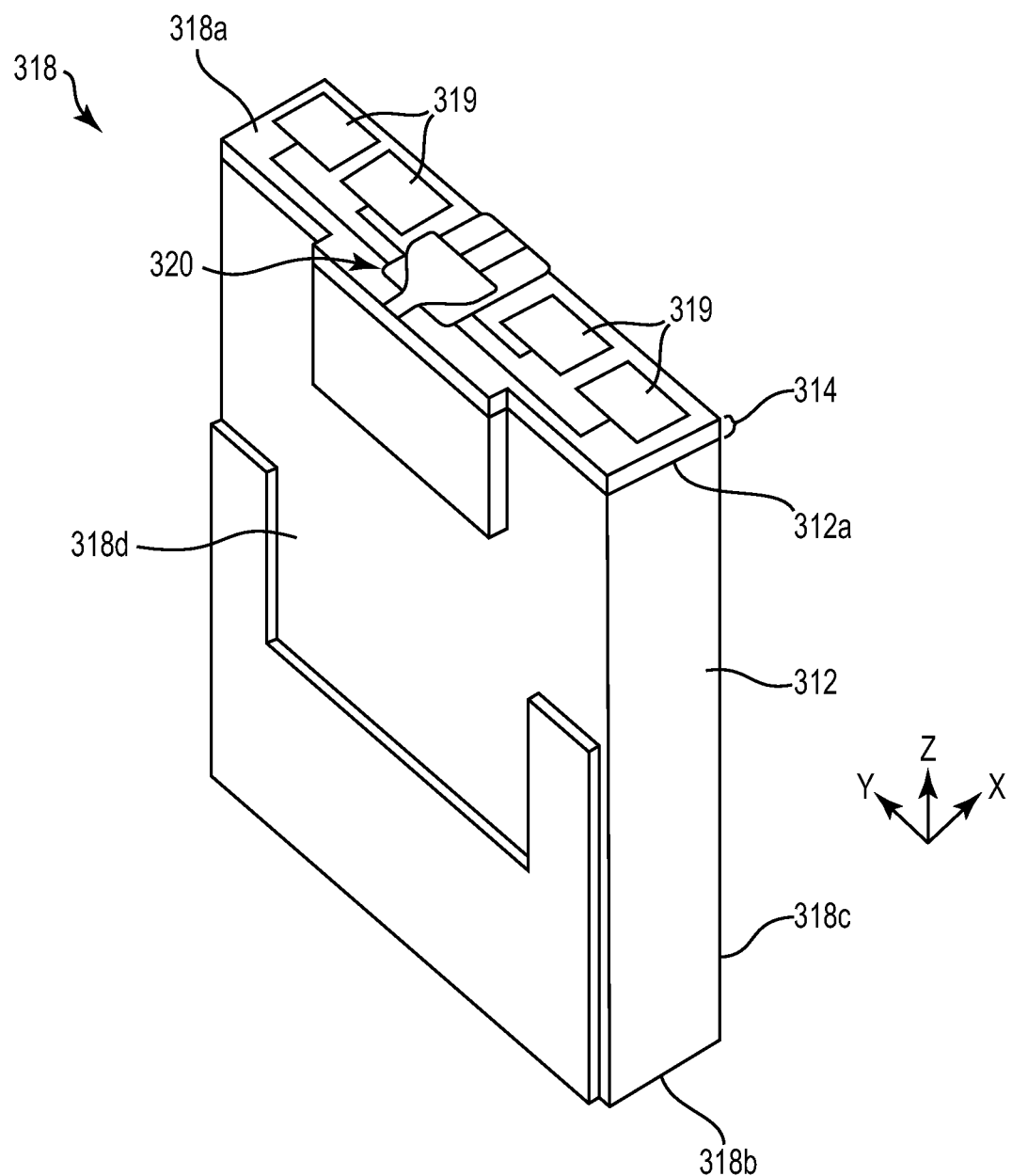
FIG. 3 is a perspective schematic view of a head that may be formed from a portion of the elongated bar of FIG. 2.

FIGS. 1-3 show schematically how a suitably fabricated wafer article 110 can be subdivided and further processed to produce a multitude of heads suitable for use as recording heads, each head preferably incorporating at least a semiconductor laser, an NFT, and a magnetic write pole. In FIG. 1, a wafer article 110 comprises a self-supporting wafer substrate 112 on which a plurality of thin layers 114 have been formed and patterned using a sequence of known batch fabrication steps. In this regard, the wafer substrate 112 is "self-supporting" when it has a mechanical integrity sufficient to permit handling of the substrate without undue breakage or other damage that would make it unsuitable in its intended application. Typically, the substrate 112 attains this physical property by being composed of a ceramic or other appropriate solid material whose thickness is great enough to provide rigidity to the substrate. The substrate material may be selected based on its suitability as a recording head or slider, and/or its suitability as a material on which thin film layers can be formed and patterned to produce magnetic devices such as one or more magnetic write elements, magnetic read elements, and/or electromagnet coils. In exemplary embodiments, the substrate 112 may be composed of a composite ceramic made primarily or exclusively of a mixture of alumina ($Al_2O_3$) and titanium carbide (TiC), such ceramic referred to here as AlTiC for convenience. AlTiC is an example of a material that is mechanically hard, with good heat dissipation properties, and can be readily ground, lapped, and polished to form precision surfaces such as an air bearing surface. The disclosed embodiments are however by no means limited to AlTiC as a substrate material; other suitable substrate materials are also contemplated. The wafer article 110 may have a maximum in-plane dimension (e.g., a diameter) that is macroscopic and relatively large, e.g., at least 1, 2, 4, 6, or 8 inches (25, 50, 100, 150, or 200 mm, respectively), and, so as to be self supporting, it may have a thickness of at least 100, 150, or 200 micrometers, for example. The reader will understand that these numbers should not be construed in an unduly limiting way.

As shown in FIG. 2, the plurality of thin layers 114 are formed on a major surface 112a of the substrate 112. Due to space and resolution constraints, FIG. 2 depicts layers 114 as having only two constituent layers, but the reader will understand that many more thin layers can be included in the layers 114. In contrast to the substrate 112, the layers 114, both individually and collectively, are typically not self-supporting. That is, the layers 114 are collectively and individually too thin and/or otherwise too fragile to permit handling (if detached from substrate 112) without undue breakage or other damage. The layers 114 include one or more first layers and one or more second layers, such layers being shown more explicitly in further embodiments below. The first layer(s) may be patterned to provide a magnetic device, such as a magnetic write pole, in each of a plurality of regions of the wafer article 110. The second layer(s) are patterned to provide a semiconductor laser in each of the plurality of regions. The regions of the wafer may be arranged in a rectangular array or other type of array when viewing the wafer article from above or in plan view. Each region of the wafer may correspond to a portion of the wafer that, after further processing, will result in a finished head.

The second layer(s), which form the semiconductor laser, include at least one layer composed of a monocrystalline semiconductor material. For example, a thin layer of monocrystalline gallium arsenide (GaAs) or an alloy thereof, which may be doped with one or more atomic species as appropriate, may form an active layer of the laser, the active layer converting charge carriers (e.g., electrons or holes) into photons whose energy or wavelength is based on the band gap energy of the semiconductor material. The monocrystalline layer(s), and some or all of any other of the second layer(s), are incompatible with epitaxial growth on the wafer substrate 112. Furthermore, as best shown in FIG. 2, the wafer article 110 is constructed or configured such that the second layer(s), which are included in layers 114, do not attach to any thick support substrate other than the wafer substrate 112. As discussed further below, this combination of features can be realized by epitaxially growing the monocrystalline layer(s), and some or all of any other of the second layer(s), on a different wafer substrate (which is referred to here as a laser wafer substrate) and then transferring those layer(s) from the laser wafer substrate to the wafer substrate 112. A transfer operation such as this can help to reduce the overall mass of the finished hybrid recording head, by eliminating the mass of the thick laser substrate on which the second layer(s) were formed. The transfer operation can also help to provide the head with a semiconductor laser having desirable design features, such as an etched output facet rather than a cleaved output facet, and/or distinct first and second laser sections coupled to each other by at least one reflective facet, where the distinct first and second sections may be parallel or perpendicular to each other, and/or where the semiconductor laser is a ring laser, for example. Additional design features of semiconductor lasers that may be incorporated into the head are described further below.

Returning to FIG. 2, this figure shows an enlarged view of a wafer section or "bar" 116 that may be diced or otherwise cut from the wafer article 110. The reader will understand that numerous such bars can be obtained from the wafer article 110 using a series of parallel cut lines. The bar 116 includes a row of regions 116-1, 116-2, 116-3, etc., which regions were originally regions of the wafer article 110 before dicing to form the bar 116. In FIG. 2, a dashed line separates adjacent regions to indicate where the bar can be further cut or otherwise subdivided to produce individual heads, one of which is shown in FIG. 3.

The head 318 of FIG. 3 may be obtained by dicing and/or performing other shaping operations such as cutting, grinding, lapping, etching, and/or polishing a wafer article such as wafer article 110 of FIG. 1 or a wafer bar such as bar 116 of FIG. 2. The head 318 may thus correspond loosely with any one of the regions 116-1, 116-2, etc. of the bar 116. The head 318 comprises a self-supporting substrate 312, which may correspond to substrate 112, and a plurality of thin layers 314, which may be the same as or similar to the plurality of layers 114 described previously. The head 318 includes opposed major surfaces 318c, 318d, and opposed surfaces 318a, 318b. Surfaces 318a, 318b, 318c, and 318d may correspond generally to surfaces 116a, 116b, 116c, and 116d respectively of the bar 116. The major surface 318d may, however, be specifically configured, e.g. with suitably shaped protrusions and/or depressions as shown, so that it can function as an air bearing surface. Air flow between the surface 318d and a writeable medium in close proximity to the head 318, and in a state of rapid relative motion relative to the head 318, maintains the surface 318d in a stable position very close to but spaced apart from such writeable medium.

The layers 314 have compositions, dimensions, and configurations that are selected to provide one or more magnetic devices, such as a magnetic write element having a magnetic write pole, and one or more and optical devices, such as a semiconductor laser. One or more first layers of the layers 314 are assumed to be patterned to provide a magnetic device, such as a magnetic write element having a magnetic write pole. One or more second layers of the layers 314 are assumed to be patterned to provide a semiconductor laser. The magnetic devices and optical devices may be disposed generally in a vicinity 320 of the head 318. Contact pads 319 may be deposited on the layers 314 as shown, and/or they may be provided elsewhere on the head 318, to provide electrical connection to the various magnetic and optical devices. Some of the contact pads may be used to supply electrical power to one or more devices, e.g., electrical current may be supplied via the contact pads to energize the semiconductor laser, and electrical current may be supplied via the contact pads to energize an electromagnet device in order to activate the magnetic write pole. Other contact pads may be used to monitor one or more of the devices.

As discussed above, at least one of the second layer(s), i.e., at least one of the thin layers that form the semiconductor laser, is a monocrystalline semiconductor material. Also as discussed above, the monocrystalline layer(s), and some or all of any other of the second layer(s), are incompatible with epitaxial growth on the substrate 312. For example, in cases where the substrate 312 is composed of AlTiC and the semiconductor laser comprises a layer composed of a monocrystalline III-V material (e.g., GaAs, GaN, InP, or alloys thereof such as GaAlAs), the monocrystalline III-V material layer is not compatible with epitaxial growth on the AlTiC substrate. GaAs-based monocrystalline materials may be used for laser wavelengths in the range of about 630-1200 nm, GaN-based monocrystalline materials may be used for laser wavelengths in the range of about 380-480 nm, and InP-based monocrystalline materials may be used for laser wavelengths in the range of about 1200-2000 nm. Also as discussed above, the head 318 is configured such that no thick support substrate other than the substrate 312 attaches to the second layer(s) which form the laser. This is apparent in the view of FIG. 3, where one can see that the fragile thin layers 314 (which include the second layer(s)) are attached to and carried by the thick self-supporting substrate 312, but are not attached to or carried by any other support substrate.

Figure 3A:
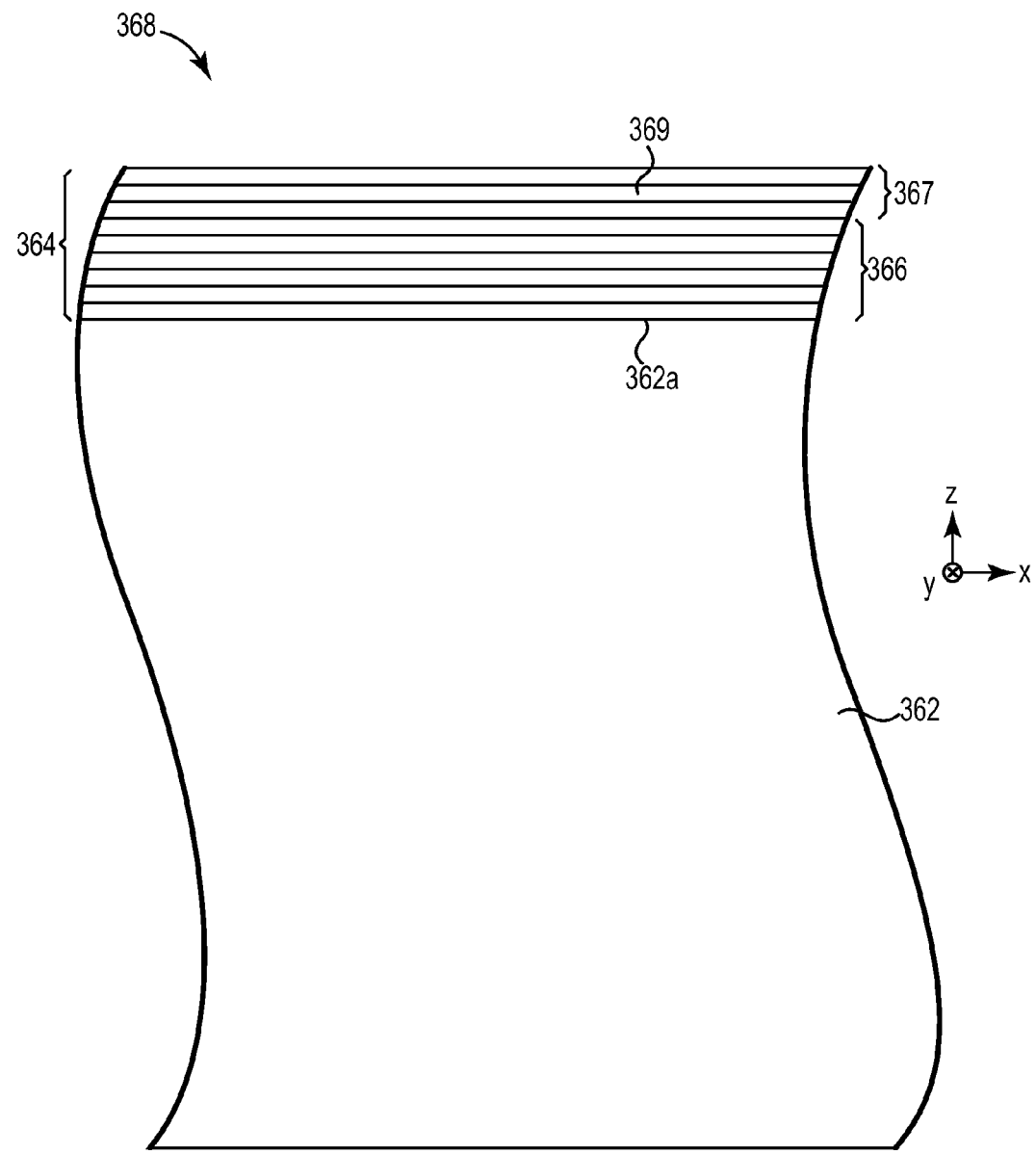
FIG. 3A is a schematic representation of a magnetic stack or head which may be the same as or similar to the head of FIG. 3 or other heads disclosed herein.

FIG. 3A is a schematic representation of a magnetic stack or head 368 having at least some of the features discussed above. The head 368 may be the same as or similar to head 318 of FIG. 3, or other heads or magnetic stacks discussed herein. The head 368 comprises a self-supporting substrate 362, which may be composed of AlTiC or other suitable substrate material, and a plurality of thin layers 364. The layers 364, collectively and individually, are not self-supporting. The layers 364 include first layers 366 and second layers 367. The first layers 366 may be patterned to provide a magnetic device, such as a magnetic write element having a magnetic write pole, and optionally other magnetic devices as well as discussed further below. The second layers 367 may be patterned to provide a semiconductor laser, and optionally one or more waveguides as discussed further below. The second layers 367 include at least one layer 369 composed of a monocrystalline semiconductor material. The monocrystalline layer 369 is incompatible with epitaxial growth on the substrate 362. The head 368 is configured such that no thick support substrate other than the substrate 362 attaches to the second layers 367 which form the laser.

Figure 4:
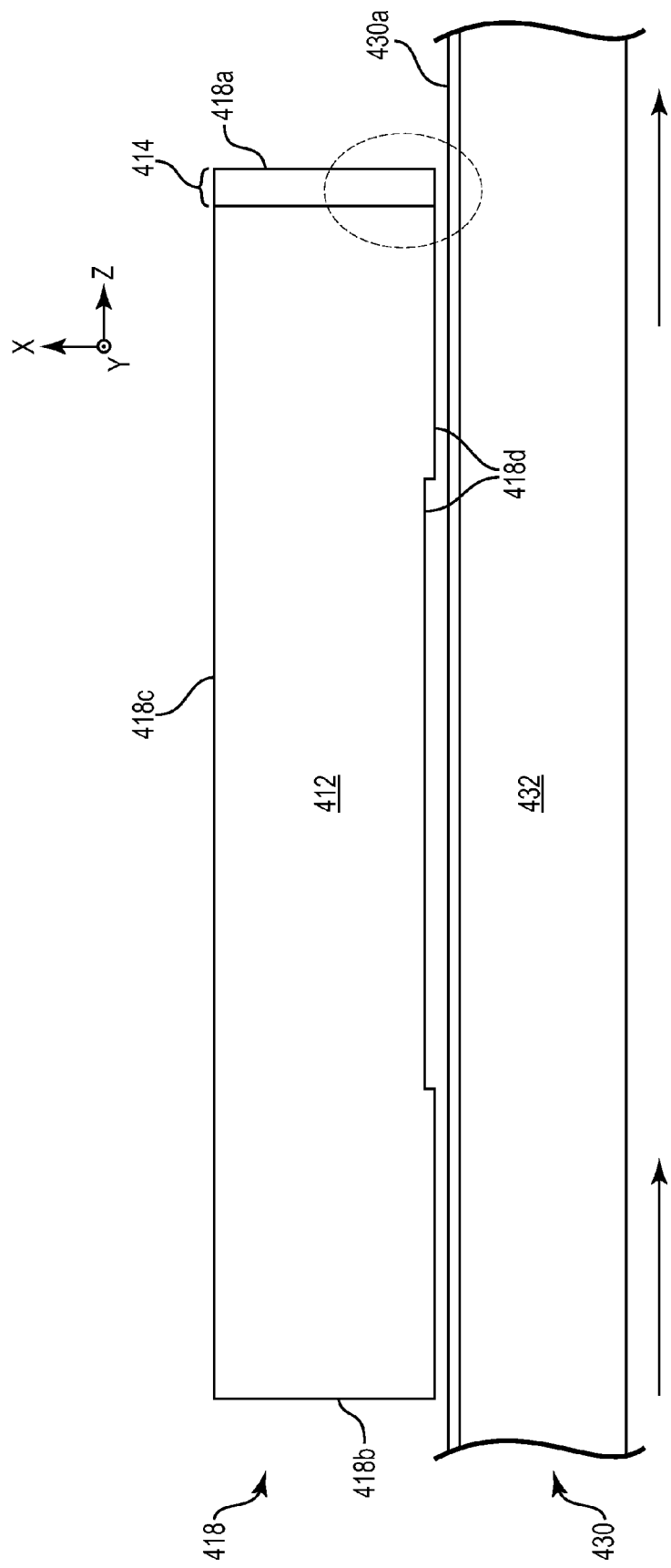
FIG. 4 is a schematic side or sectional view of a system in which a head is held in a spaced-apart relation with respect to a writeable medium to allow relative motion between the head and the writeable medium.

Turning now to FIG. 4, a schematic side or sectional view is shown of a system in which a magnetic stack or head 418 is held in a spaced-apart relation ("flys") with respect to a writeable medium 430 that is in a state of rapid relative motion with respect to the head. The medium 430 may in some cases be in the form of a circular disk that rotates about a central axis. Such an arrangement is described further below in connection with FIG. 23. The rotating media may define circular or spiral "tracks" of writeable information bits, and the head can be described in relation to a local coordinate system comprising a down-track direction (see e.g. the z-axis in FIG. 4) and a cross-track direction (see e.g. the y-axis in FIG. 4). In FIG. 4, the head 418, supported via a pivot arm or other structure (not shown in FIG. 4), hovers close to an outer surface 430a of a writeable medium 430 which moves along the positive z-axis as shown. The reader will understand that any type of relative motion may be provided between the two bodies as desired: the medium 430 may move along the positive z-axis, the head 418 may move along the negative z-axis, or a combination thereof can be employed. The writeable medium is shown as having a support plate or substrate 432 on which one or more thin magnetic layers may be disposed.

The head 418 may be the same as or similar to the head 318 of FIG. 3. Thus, exterior surfaces 418a, 418b, 418c, 418d may correspond to surfaces 318a, 318b, 318c, 318d, respectively. The head 418 is shown to have a thick (at least along the z-direction) self-supporting substrate 412 which attaches to and carries a plurality of non-self-supporting layers 414. The substrate 412 and layers 414 may be the same as or similar to substrate 312 and layers 314, respectively. As the medium 430 passes by the head 418, the semiconductor laser in the head can be selectively energized in order to assist in writing information to the medium by heating selected portions of the medium. The close-up view of FIG. 5 helps to better illustrate one of many ways in which this may be carried out.

Figure 5:
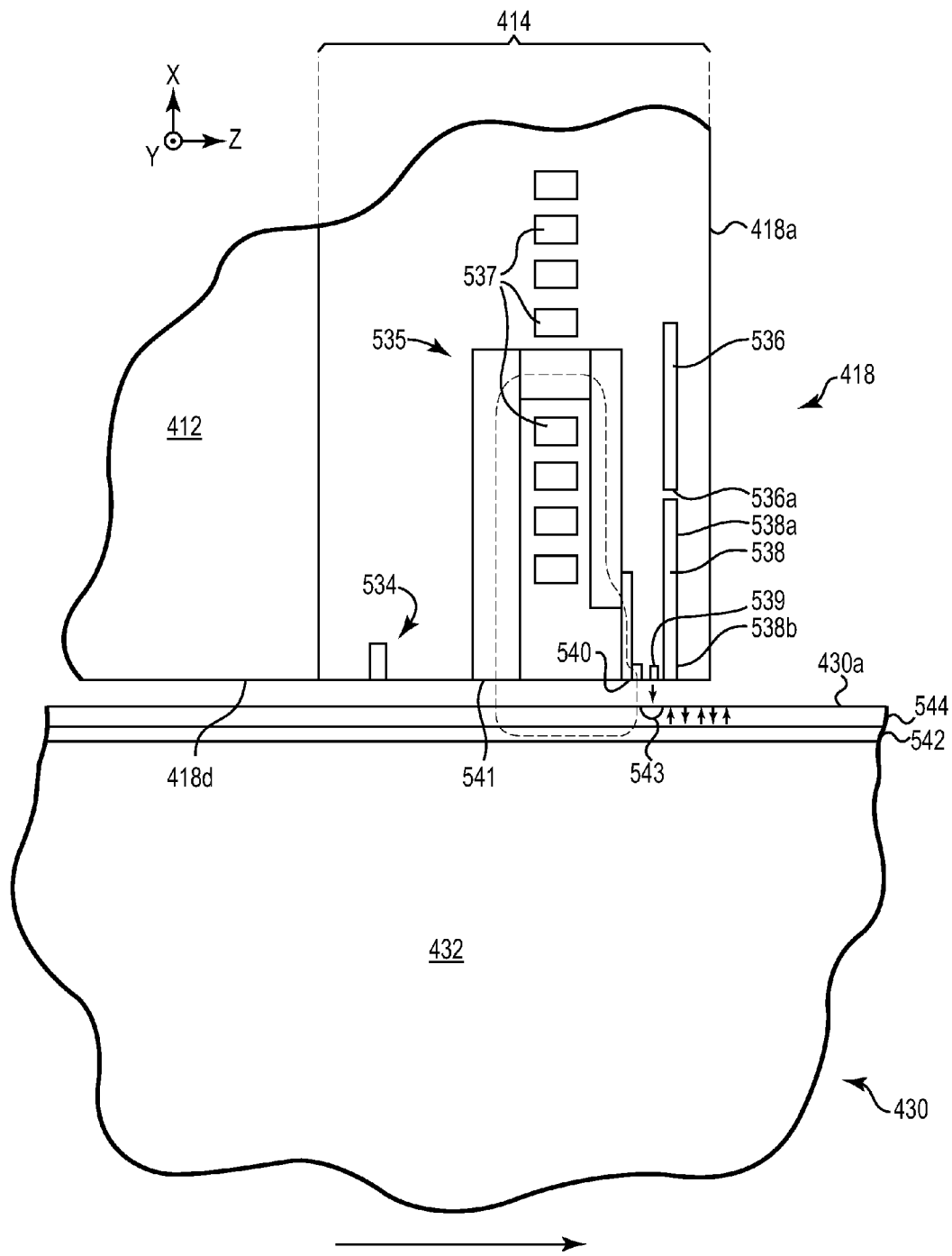
FIG. 5 is an enlarged schematic side or sectional view of a portion of the system of FIG. 4.

FIG. 5, though also in schematic form, depicts additional structures and features that may be included in the components shown in FIG. 4. The body 418 comprises the relatively thick substrate 412 on which is disposed the plurality of thin layers 414. The layers 414 cooperate to build the respective elements of the head 418. The layers 414 may include a plurality of first layers tailored to form, for example, a magnetic write element 535 and a magnetic read element 534, the design and fabrication of which are known generally in the art. The layers 414 may also be patterned to form coils 537 which, when energized with an electrical current, produce a magnetic field (shown schematically as a circuitous dashed line) that passes through the write element 535 and through a portion of the writeable medium 430. One end or terminus 540 (referred to as a write pole) of the write element 535 may be configured to produce a high flux density of the magnetic field. Another end or terminus 541 (referred to as a return pole) of the write element 535, coupled to the write pole 540 via a yoke of the write element, may be configured to produce a lower flux density.

The layers 414 also include a plurality of second layers tailored to form at least a semiconductor laser 536. The laser 536 includes at least one monocrystalline layer that is not compatible with epitaxial growth on the substrate 412, and that is not attached to any support substrate other than the substrate 412. Further details regarding how the monocrystalline layer may be transferred from its original growth substrate to the substrate of the head are provided below. Details on the wide variety of possible laser designs that may be used in the head are also provided below. In some cases, the laser 536 may comprise a distinct output facet 536a, and the output facet may be an etched facet rather than a cleaved facet. Close inspection and analysis of the facet, e.g. by means of electron microscopy and other suitable analytical instrumentation, can be used to reveal physical characteristics that distinguish a cleaved facet from an etched facet. In addition to forming a semiconductor laser, the layers 414 may also be patterned to form a (passive) waveguide 538, and an NFT 539.

The writeable medium 430 may be configured in any known way, but typically it includes a plate or substrate 432 on which at least a soft magnetic underlayer 542 and a hard magnetic layer 544 are deposited or otherwise formed. A small portion or spot 543 of the layer 544 may be heated sufficiently to reduce the coercivity of the material enough so that the magnetic field from the magnetic write pole 540 is strong enough to change the magnetization direction of the recording layer. Bits of information may then be recorded in the form of a perpendicular upward or downward magnetization direction for a series of magnetic domains in the layer 544.

The heating of the spot 543 in connection with the write procedure may be provided directly by the NFT 539 and indirectly by the laser 536. When the laser 536 is energized, laser light is emitted from the output facet 536a towards an input end 538a of the waveguide 538. The laser light coupled into the waveguide, whether by end-fire coupling or otherwise, is conveyed to a distal end 538b of the waveguide. In some cases, the distal end may correspond to a focal point or focal region of a solid immersion mirror (SIM) or a solid immersion lens (SIL). Located at or near the distal end 538b is the NFT 539, which may be formed as part of the plurality of layers 414. The NFT utilizes plasmons to convert the power density of the incident laser light into a high power density in a near-field region that is typically smaller than the diffraction limit for the laser light. The high power density provided by the NFT in the near-field region is absorbed by the nearby writeable medium to produce localized heating of the spot 543. By positioning an emitting end of the NFT close enough to the write pole 540 of the write element 535, at least a portion of the heated spot 543 can be exposed to the high magnetic flux emitted by the write pole before passing out of range (due to the relative motion of the writeable medium 430) so that the magnetic field at the write pole is capable of changing the magnetization direction of the spot 543.

The NFT 539 may be a suitably sized pin or other structure and may be made of a metal such as gold or other suitable materials. The NFT 539 may have any suitable design known in the art. The NFT 539 is shown in FIG. 5 to be close to but separated from waveguide 538, but in other embodiments the NFT may be disposed within the waveguide. In still other embodiments, described elsewhere here, the waveguide may be omitted, and the NFT may couple directly to the semiconductor laser.

Figure 5A:
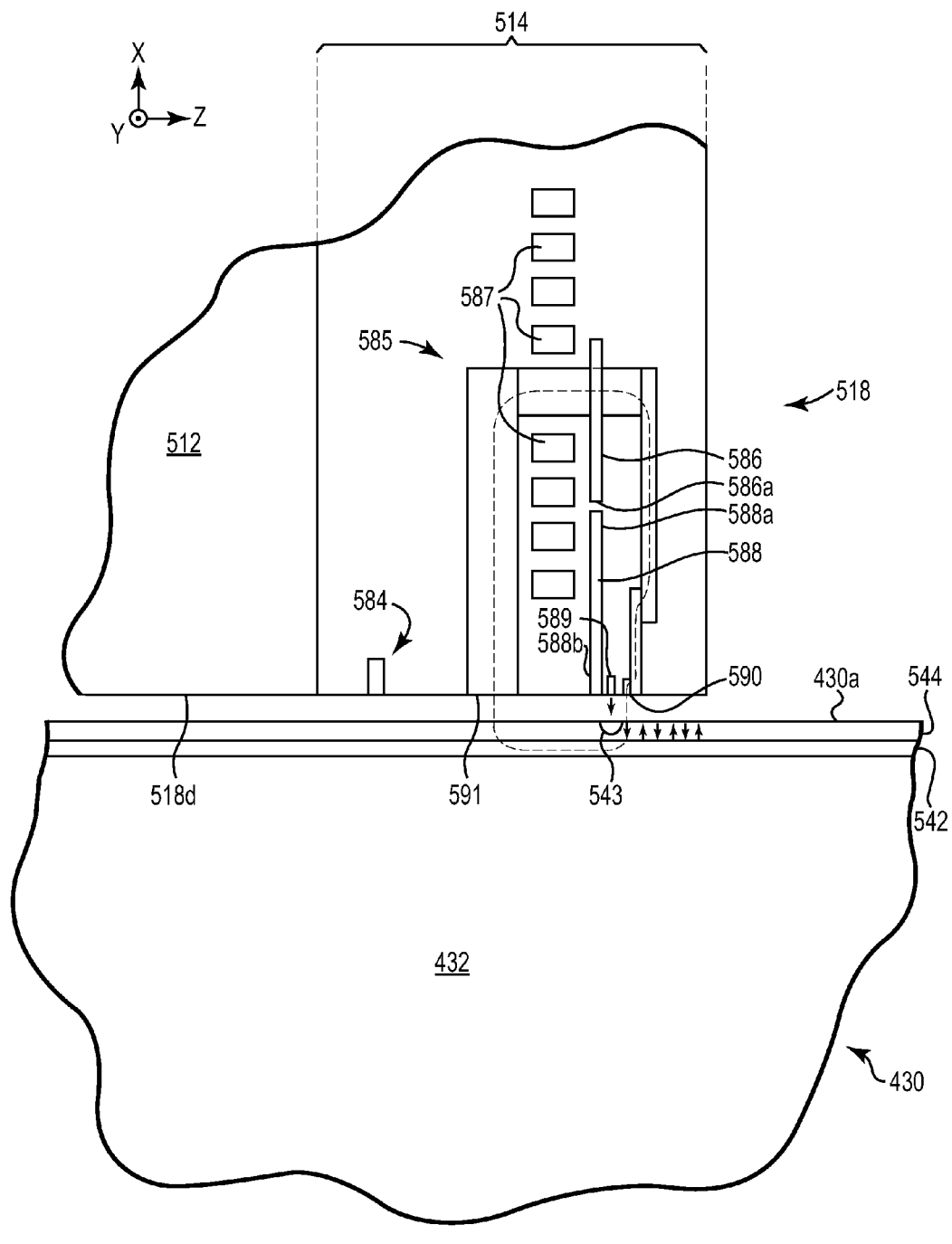
FIG. 5A is an enlarged schematic side or sectional view similar to that of FIG. 5 but for an alternative embodiment in which the waveguide and NFT are arranged differently with respect to the magnetic write pole.

An alternative embodiment to that of FIG. 5 is shown schematically in FIG. 5A. In FIG. 5A, a magnetic stack or head 518 may be similar to the head 418 of FIGS. 4 and 5, except that the semiconductor laser, the waveguide, and the NFT in head 518 are arranged differently with respect to the magnetic write pole. Reference numbers that are the same in the different figures designate elements that are the same, and no further discussion of those elements is necessary. Similar to head 418, head 518 has a major surface 518d that may be shaped to provide an air bearing surface. The head 518 includes a relatively thick, self-supporting substrate 512 on which is disposed a plurality of thin, non-self-supporting layers 514. The substrate 512 may be the same as or similar to substrate 412 of FIGS. 4 and 5. The layers 514 may include a plurality of first layers tailored to form, for example, a magnetic write element 585 and a magnetic read element 584. The layers 514 are also patterned to form coils 587 which can be energized with an electrical current to produce a magnetic field shown schematically as a circuitous dashed line that passes through the write element 585. One end or terminus 590 of the write element 585 is configured as a write pole, and another end or terminus 591 is configured as a return pole.

The layers 514 also include second layers tailored to form a semiconductor laser 586, which includes at least one monocrystalline layer that is not compatible with epitaxial growth on the substrate 512 and is not attached to any support substrate other than the substrate 512. The laser 586 may comprise a distinct output facet 586a, which may be etched rather than cleaved. The layers 514 may also be patterned to form a (passive) waveguide 588, and an NFT 589. The NFT 589 is shown to be close to but separated from waveguide 588, but in other embodiments the NFT may be disposed within the waveguide. In still other embodiments, described elsewhere herein, the waveguide may be omitted, and the NFT may couple directly to the semiconductor laser, i.e., without an intervening waveguide.

The various magnetic and optical devices that may be incorporated into the heads previously discussed can be fabricated using known solid state manufacturing processes. In these processes, sequences of layers can be grown, deposited, oxidized, attached, patterned, etched, dissolved, and/or removed, for example, in order to produce one or more microscopic structures that can function as the desired working device.

Of these various devices, the semiconductor laser poses unique challenges for incorporation into the finished head. This is because the semiconductor laser would typically include at least one thin monocrystalline layer, e.g., a layer of III-V semiconductor material having a particular band gap energy, and in many cases the laser would include a stack of such thin layers. Such layers are typically formed by epitaxial growth on a crystalline substrate whose properties (e.g. lattice constant) are specifically tailored for the growth of the particular epitaxial layers that are needed. The crystalline (laser) substrate is self-supporting and relatively thick so that it can be physically handled and manipulated during fabrication. Semiconductor lasers formed on such substrates are typically singulated (separated from each other) by dicing and cleaving procedures, which result in individual semiconductor lasers that are firmly bonded to a portion of the original (thick) crystalline substrate, such lasers also having a cleaved output facet and consequently a limited design flexbility when it comes to integrating the laser with the head.

The techniques disclosed herein are able to, in at least some cases, overcome these restrictions and challenges. Furthermore, the techniques can employ parallel processing of numerous semiconductor lasers on a single recording head wafer (referred to here as a "head wafer", to be distinguished from the crystalline "laser wafer" on which the epitaxial layers used for the laser are grown), with potentially significant cost savings. Thin film patterning and processing techniques also allow semiconductor lasers of atypical sizes and shapes to be integrated into the recording head.

In one approach, isolated regions (referred to herein as "islands") of the laser epitaxial material can be attached to the head wafer using wafer-to-wafer bonding or hybrid bonding/pick-and-place techniques. In wafer-to-wafer bonding, a laser wafer that is completely covered on one side with thin layers of epitaxial material is bonded to a head wafer, the head wafer optionally having already been processed to some extent so that it includes thin films patterned into one or more devices, e.g., a magnetic read element, a magnetic write element, a magnetic write pole, electromagnet coils, a waveguide, and/or an NFT, such device(s) preferably being formed in each of a multitude of defined regions on the head wafer, the regions corresponding to individual heads after singulation of the finished head wafer. After bonding but preferably before singulation, further processing can be used to remove the crystalline substrate of the laser wafer without removing the thin epitaxial layers, so that the epitaxial layers are no longer attached to the crystalline substrate but remain attached to the head wafer. The epitaxial layers can then be further processed e.g. using photolithographic techniques so as to form a semiconductor laser in each of the designated wafer regions using conventional thin film processing techniques. After formation of the lasers, depending upon the configuration of devices desired in the finished heads, additional processing may be performed to add additional thin films patterned into one or more additional devices, e.g., a magnetic read element, a magnetic write element, a magnetic write pole, electromagnet coils, a waveguide, and/or an NFT, such device(s) again preferably being formed in each designated region of the head wafer. When processing of the head wafer is complete, it may be diced, lapped, polished, and so forth to produce a head from each region of the wafer, as described above in connection with FIGS. 1-3.

Hybrid bonding pick-and-place methods can also be used. This may involve, for example, patterning islands of the thin epitaxial layers on the laser substrate. An array of such islands of the epitaxial layer stack may then be separated from the laser substrate, using parallel or serial methods. The array of islands may then be transferred and bonded to the head wafer, each island being bonded to a given one of the array of regions intended for use as a head. Before bonding of the islands to the head wafer, the head wafer may optionally have already been processed to some extent so that it includes thin films patterned into one or more devices, e.g., a magnetic read element, a magnetic write element, a magnetic write pole, electromagnet coils, a waveguide, and/or an NFT, such device(s) preferably being formed in each of a multitude of defined regions on the head wafer, in each region of the head as discussed above. In some cases, the islands of epitaxial layers may be bonded to the head wafer using islands of adhesive that have the same or similar size and layout/arrangement as the islands of epitaxial layers. After attachment to the head wafer, the islands of epitaxial layers can then be further processed e.g. using photolithographic techniques so as to form a semiconductor laser in each of the designated wafer regions using conventional thin film processing techniques. After formation of the lasers, depending upon the configuration of devices desired in the finished heads, additional processing may be performed to add additional thin films patterned into one or more additional devices, e.g., a magnetic read element, a magnetic write element, a magnetic write pole, electromagnet coils, a waveguide, and/or an NFT, such device(s) again preferably being formed in each designated region of the head wafer. When processing of the head wafer is complete, it may be diced, lapped, polished, and so forth to produce a head from each region of the wafer, as described above in connection with FIGS. 1-3.

Using techniques such as these, in which the epitaxial layers are transferred from the laser wafer or substrate to the head wafer or substrate, followed by further processing of the epitaxial layers while they are attached to the head wafer (and detached from the laser wafer) so as to pattern the epitaxial layers into a structure that can function as a semiconductor laser, allows for laser designs to be used that are atypical for recording head applications, but that may have distinct advantages in such applications. Conventional edge-emitting semiconductor lasers have output facets that are mechanically cleaved, which imposes restrictions on the shape of the facet and the shape of the laser cavity. In contrast, semiconductor lasers disclosed herein for use on the disclosed heads need not have any cleaved output facets, but may instead have one or more etched output facets, which allows for greater design flexibility. Also, conventional edge-emitting semiconductor lasers incorporate a section of the original self-supporting crystalline substrate, which imposes restrictions on how small (both in size and in mass) the laser device can be made. In contrast, semiconductor lasers disclosed herein can be made to be much smaller in size and in mass due to the absence of the original crystalline substrate.

Figure 6A:
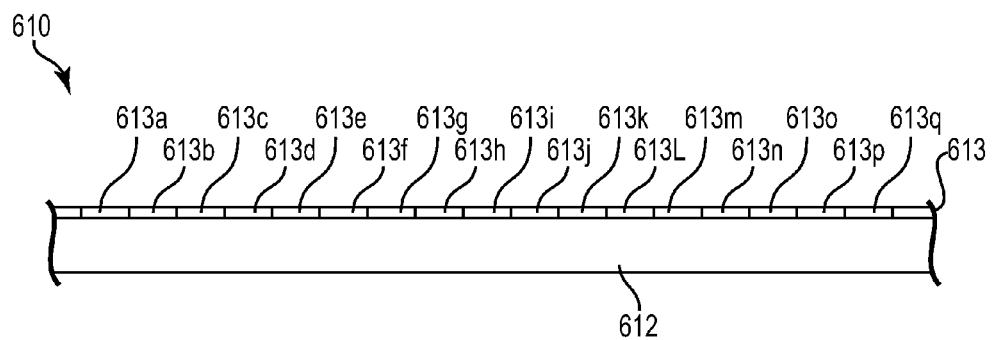
FIGS. 6A through 6F are a series of schematic side or sectional views showing how islands of crystalline seed material can be attached to a target substrate in each of a plurality of regions of the target substrate.

Turning now to FIGS. 6A through 6F, illustrates there is one way in which islands of epitaxial material may be transferred from a laser wafer to a head wafer. In FIG. 6A, a laser wafer 610 comprises a relatively thick, self-supporting monocrystalline substrate 612, on which has been formed at least one and more typically a stack of thin (non-self-supporting) layers 613, at least one of which, and in some cases all of which, are monocrystalline. The thin monocrystalline layer(s) have been formed by epitaxial growth on the substrate 612; hence, such layer(s) are compatible with epitaxial growth on the substrate 612. Any suitable epitaxial growth technique(s) may be used, including without limitation molecular-beam epitaxy (MBE), liquid-phase epitaxy (LPE), vapor-phase epitaxy (VPE), and solid-phase epitaxy (SPE), for example. In the case of semiconductor lasers tailored to emit light in the near infrared region (e.g. 700 to 900 nanometer wavelength), the substrate 612 and layers 613 may comprise GaAs or alloys thereof. In FIG. 6A, the stack of layers 613 has been divided by etching or other processing steps into isolated regions or islands 613a, 613b, 613c, and so forth, that may be described as closely spaced or densely packed on the substrate 612.

Figure 6B:
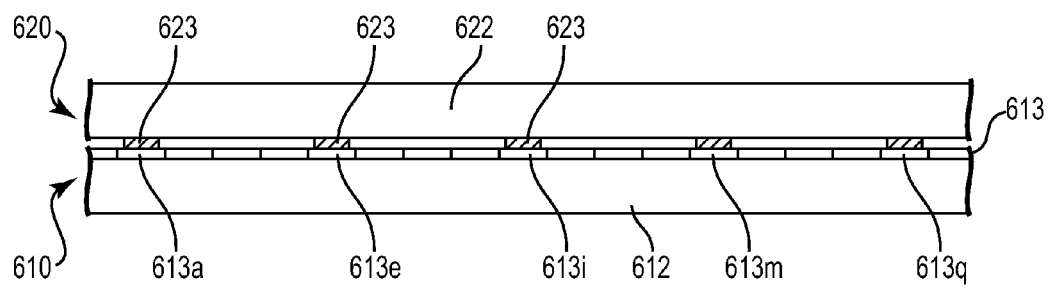
Figure 6C:
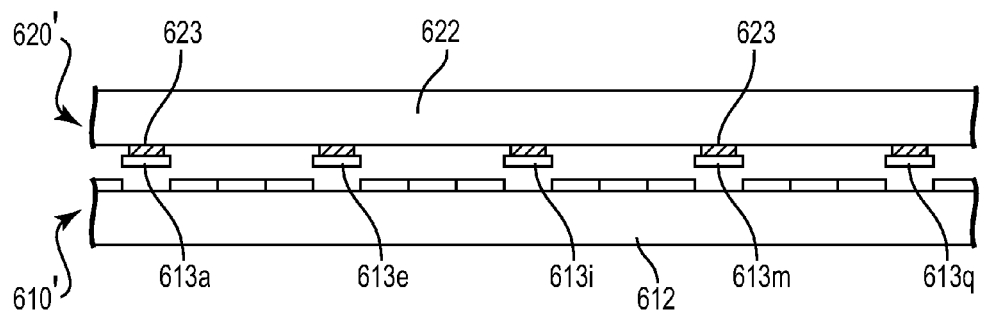

In FIG. 6B, an intermediate wafer 620 is brought into contact with the wafer 610 at selected locations. The wafer 620 comprises a substrate 622 and spots or pads 623 of removable adhesive that may be placed strategically on the substrate 622 so as to make contact with selected ones of the islands of layer stack 613. The substrate 622 may be thick, self-supporting, and stable in order to maintain the relative position and spacing of islands that are adhered to, after detachment of the islands from the original substrate 612. The detachment is shown in FIG. 6C. There, the intermediate wafer is pulled apart from the laser wafer, and the islands 613a, 613e, 613l, 613m, 613q of epitaxial layers separate from substrate 612 and adhere to substrate 622 via the adhesive pads 623. The separation is carried out in such a way as to preserve the physical integrity of the individual layers within the separated islands 613a, 613e, 613l, 613m, 613q of epitaxial layers. The separation causes the original laser wafer 610 to be modified due to the absence of the separated islands of the layer stack 613. The laser wafer modified in this way is identified with the modified reference number 610'. Similarly, the separation causes the original intermediate wafer to be modified due to the presence of the separated islands of the layer stack 613. The intermediate wafer modified in this way is identified with the modified reference number 620'.

Figure 6D:
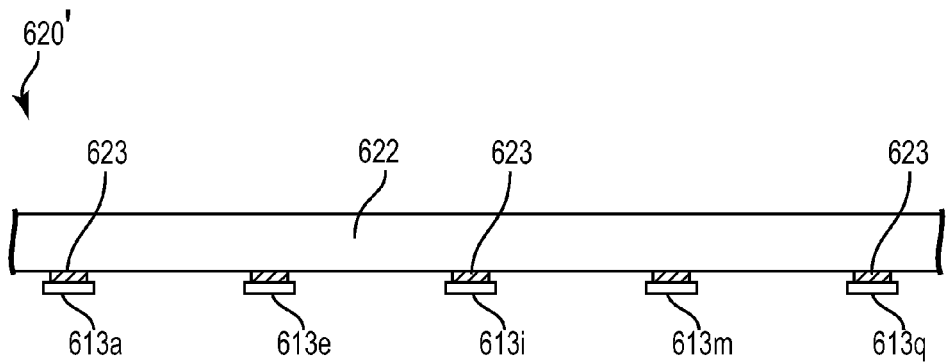
Figure 6E:
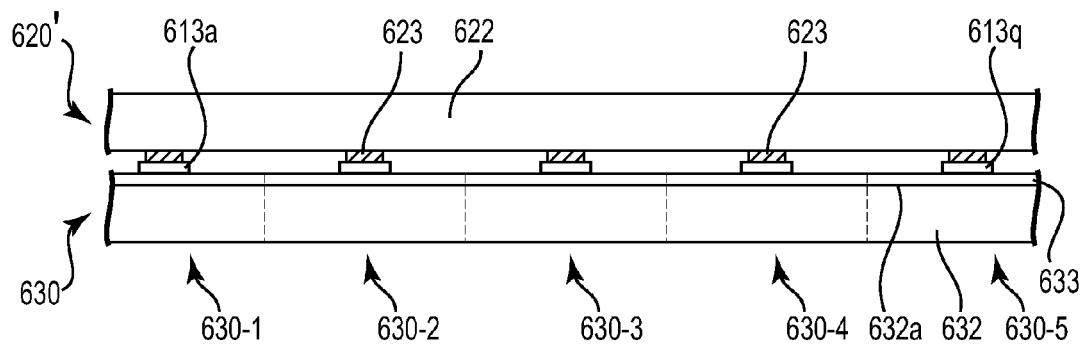
Figure 6F:
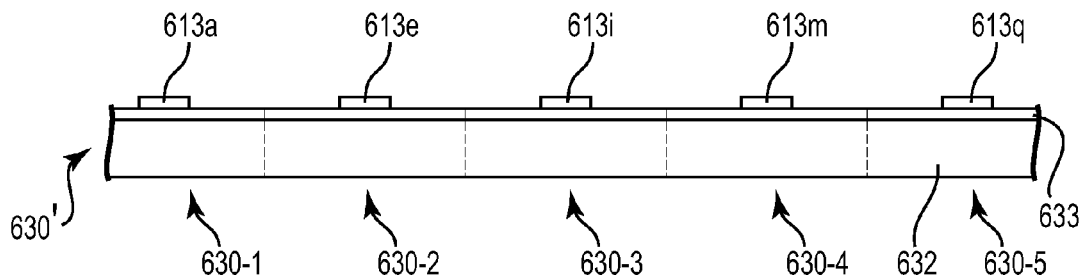

In FIG. 6D, the modified intermediate wafer 620', with its selected islands of the original layer stack 613, is shown by itself after the separation procedure of FIG. 6C. The wafer 620' may for example be picked up and transported by automated means or otherwise to another location where it can be brought into contact with a head wafer. Such mating of the intermediate wafer 620' with a head wafer 630 is shown in FIG. 6E. The head wafer 630 comprises a self-supporting substrate 632, and it may also comprise one or more non-self-supporting thin film layers 633 that have been deposited or otherwise formed on one of the opposed major surfaces 632a of the substrate 632. The substrate 632 is composed of a material that is not compatible with the epitaxial growth of a monocrystalline layer in the layer stack 613. Thus, one or more monocrystalline layers in each of the islands 613a, 613e, 613l, 613m, 613q is not compatible with epitaxial growth on the substrate 632. The composition of the substrate 632 may be selected based on desirable recording head properties, e.g., the substrate 632 may be or comprise an amorphous ceramic such as AlTiC. In some cases, depending on the desired physical arrangement of the semiconductor laser relative to other devices in the head, the layers 633 may be processed and configured, before contacting the head wafer 630 with the intermediate wafer 620', to form one or more devices, e.g., a magnetic read element, a magnetic write element, a magnetic write pole, electromagnet coils, a waveguide, and/or an NFT, and such device(s) may be formed in each of a multitude of defined regions 630-1, 630-2, 630-3, 630-4, 630-5, etc. of the head wafer, each of these regions corresponding to individual heads after singulation of the finished head wafer. Before making contact with the head wafer 630, the intermediate wafer 620' is aligned with the head wafer in such a way that the islands 613a, 613e, etc. are in registration with the defined regions 630-1, 630-2, etc. In this regard, the manner in which the stack of layers 613 is divided into islands on laser wafer 610 (see FIG. 6A), and the selection of which islands to remove with the intermediate wafer 620, is carried out so that the spacing of the selected islands matches the spacing of the regions on the head wafer.

In some cases, an adhesive may be used to bond the islands 613a, 613e, etc. to the head wafer 630, while in other cases direct bonding methods may be used that do not require adhesives. In either case, the islands 613a, 613e, etc. are bonded to the head wafer so that they are in registration with the defined regions 630-1, 630-2, etc. Thereafter, the adhesive pads 623 that bond the islands to the intermediate wafer substrate 622 may be dissolved or otherwise eliminated, and the intermediate substrate 622 is removed. The result is a modified head wafer 630', which is the head wafer 630 in combination with the attached islands 613a, 613e, etc.

Given the modified head wafer 630', the islands 613a, 613e, etc. of epitaxial layers can then be further processed e.g. using photolithographic techniques so as to form a semiconductor laser in each of the designated wafer regions using conventional thin film processing techniques. After formation of the lasers, depending upon the configuration of devices desired in the finished heads, additional processing may be performed to add additional thin films patterned into one or more additional devices, e.g., a magnetic read element, a magnetic write element, a magnetic write pole, electromagnet coils, a waveguide, and/or an NFT, such device(s) again preferably being formed in each designated region of the head wafer. When processing of the head wafer is complete, such that it contains at least an operational semiconductor laser and a magnetic write pole, and optionally a magnetic read element, a magnetic write element, an electromagnet coil, a waveguide, and/or an NFT, it may substantially correspond to the wafer 110 of FIG. 1.

Figure 6G:
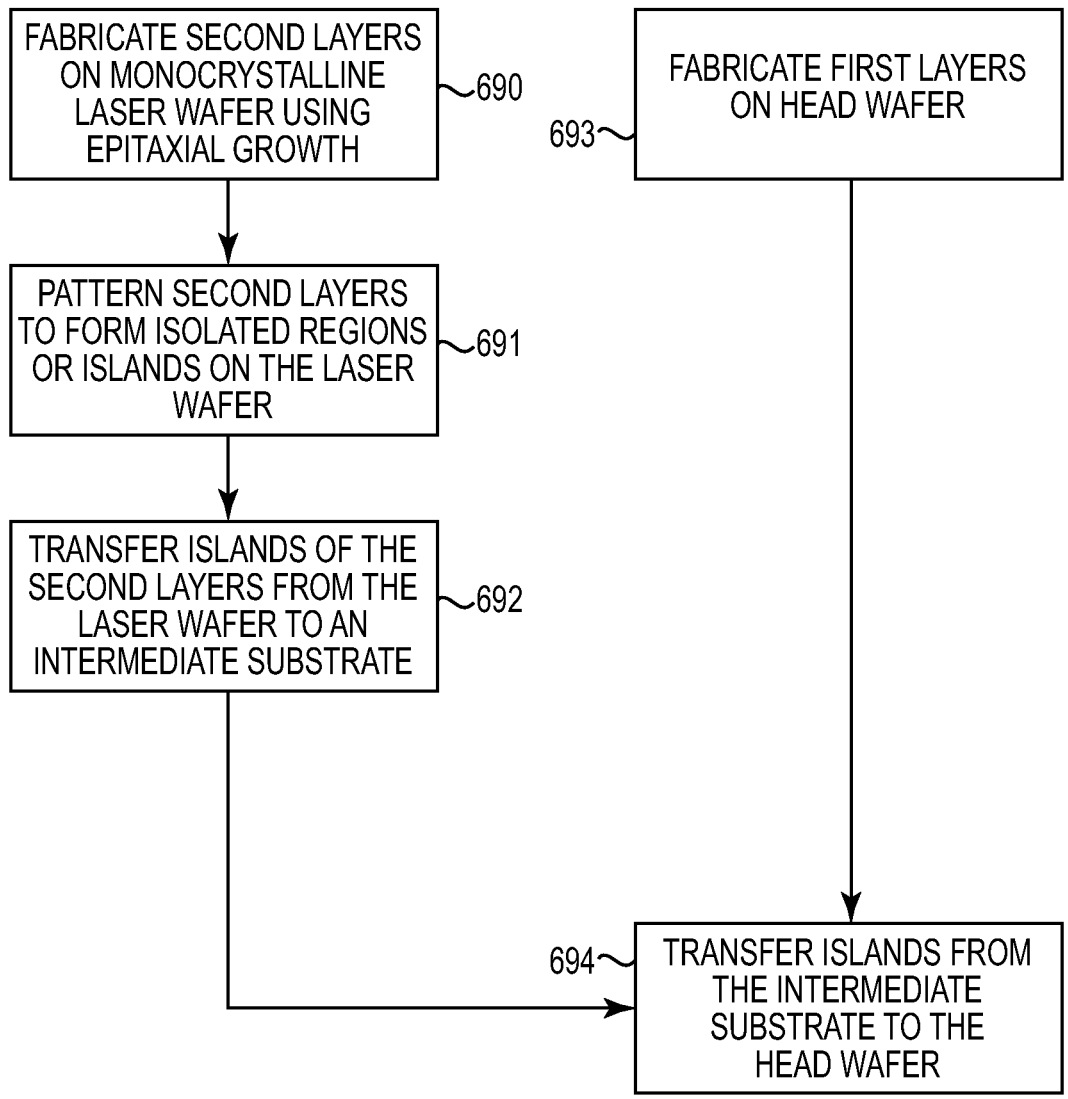
FIG. 6G is a high-level flow chart of a process associated with FIGS. 6A-6F.

A high-level summary of a process associated with FIGS. 6A-6F is provided in the flow chart of FIG. 6G. In box 690, thin (non-self-supporting) second layers are fabricated on a monocrystalline laser wafer using epitaxial growth. The second layers include at least one monocrystalline layer that is, or may be further processed to become, a component of a laser. In box 691, the second layers are patterned to form isolated regions or islands on the laser wafer. In box 692, islands of the second layers are transferred from the laser wafer to an intermediate substrate. In box 693, first layers are fabricated on the head wafer. The first layers include, or may be further processed to include, one or more devices such as a magnetic read element, a magnetic write element, a magnetic write pole, and electromagnet coils. In box 694, the islands of the second layers are transferred from the intermediate substrate to the head wafer.

Figure 7:
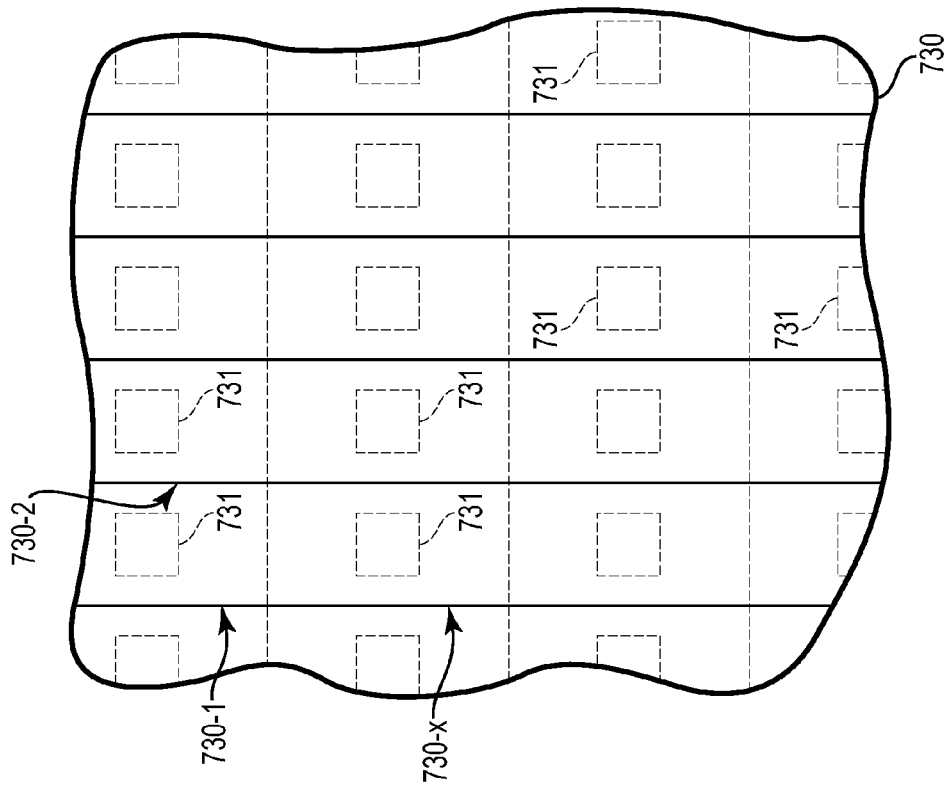
FIG. 7 is a schematic top or plan view of a layer of crystalline seed material and a corresponding target substrate showing how a limited amount of the seed material can be used to populate the relatively larger regions of the target substrate.
Figure 7:
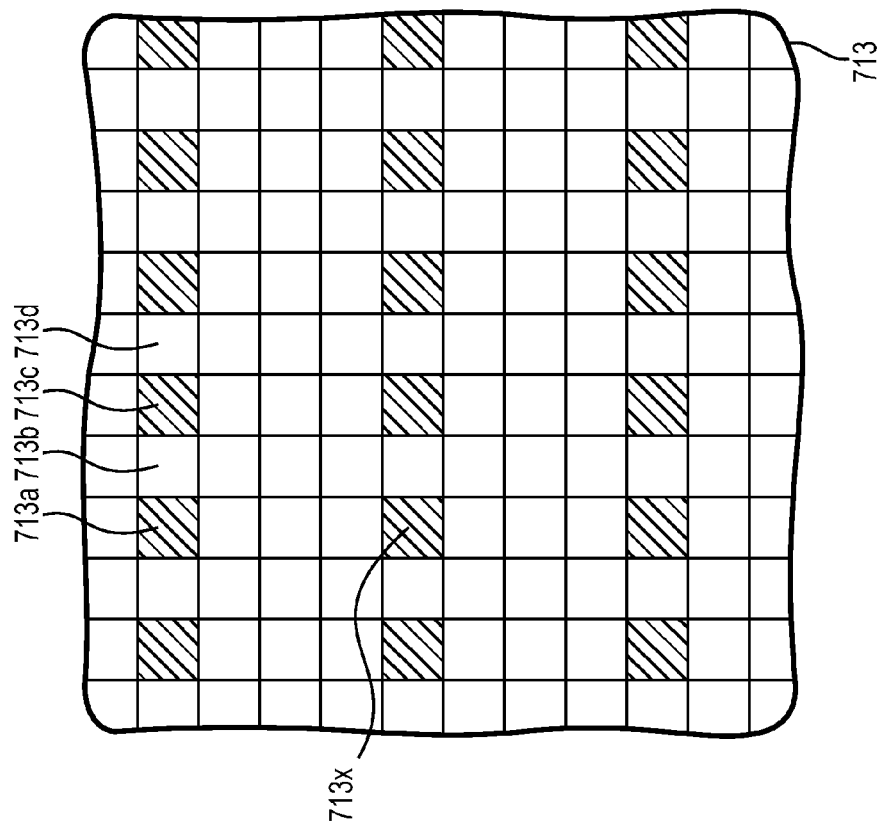

FIG. 7 is provided to demonstrate in plan view how islands of epitaxial layers can be selected from a densely packed array of islands on a laser wafer (donor substrate) so as to occupy a more sparsely packed array of regions on a head wafer (target substrate). In the figure, reference number 713 refers to a stack of thin (non-self-supporting) layers that have been formed at least in part by epitaxial growth on a self-supporting monocrystalline substrate. The stack of layers 713 may thus be the same as or similar to the stack of layers 613 depicted in FIG. 6a. The stack of layers 713 has been divided by etching or other processing steps into isolated regions or islands 713a, 713b, 713c, and so forth, that may be described as closely spaced or densely packed on the monocrystalline substrate (donor substrate) of the laser wafer. Using an intermediate substrate as explained above, a selected set of the islands can be transferred from the donor substrate (laser wafer) to the target substrate (head wafer) in parallel, i.e., simultaneously, while retaining their relative spatial positions with respect to each other. Reference number 730 refers to the head wafer in plan view, with defined regions 730-1, 730-2, etc. corresponding to individual heads after singulation of the finished head wafer. Head wafer 730 may thus be the same as or similar to head wafer 630 of FIG. 6e. In FIG. 7, it is assumed that, in each defined region, the finished semiconductor laser will only need to occupy a limited portion of the real estate (in-plane area) of the defined region, the limited portion being represented in each case by dashed boxes 731.

One can readily see from the figure that in order to populate the limited portion 731 of each defined region of the head wafer 730 with an island of epitaxial layers, only the islands that are shaded in FIG. 7 (i.e., islands 713a, 713c, . . . , 713x, . . . ) need to be transferred to the head wafer by the intermediate substrate. Island 713a may be transferred to the limited portion 731 of region 730-1, island 713c may be transferred to the limited portion 731 of region 730-2, island 713x may be transferred to the limited portion 731 of region 730-x, and so forth. In this way, the densely packed array of islands on the laser wafer can populate a more sparsely packed array of regions on the head wafer, allowing a laser wafer to be used efficiently to populate more than one head wafer. That is, islands of epitaxial layers (713b, 713d, . . . ) that remain on the laser wafer after removal of one set of islands (713a, 713c, . . . , 713x, . . . ) can be used in a subsequent operation to populate an array of regions on one or more subsequent head wafers, until the islands on the laser wafer are depleted.

Figure 8A:
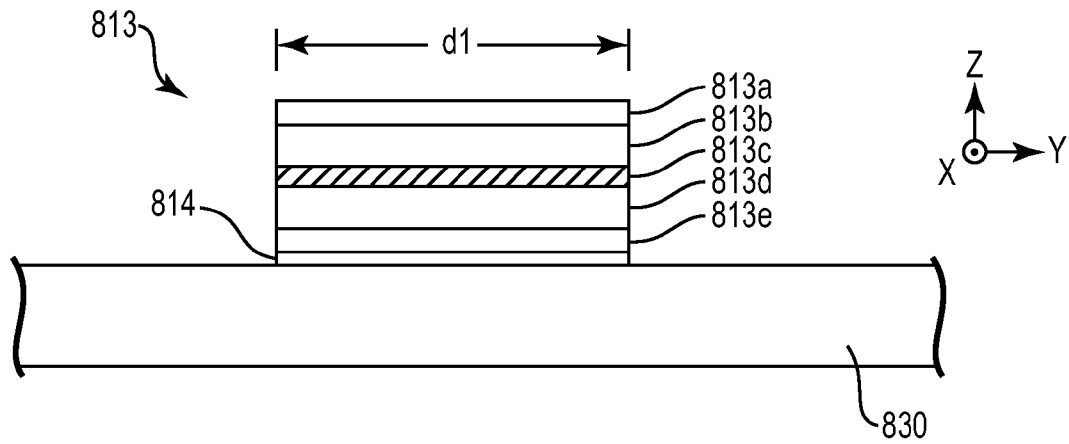
FIGS. 8A through 8C are a series of schematic side or sectional views showing how non-self-supporting monocrystalline layers, after being separated from their original crystalline seed layer and attached to a head wafer, can be processed to form a functional semiconductor laser on the head wafer.
Figure 8B:
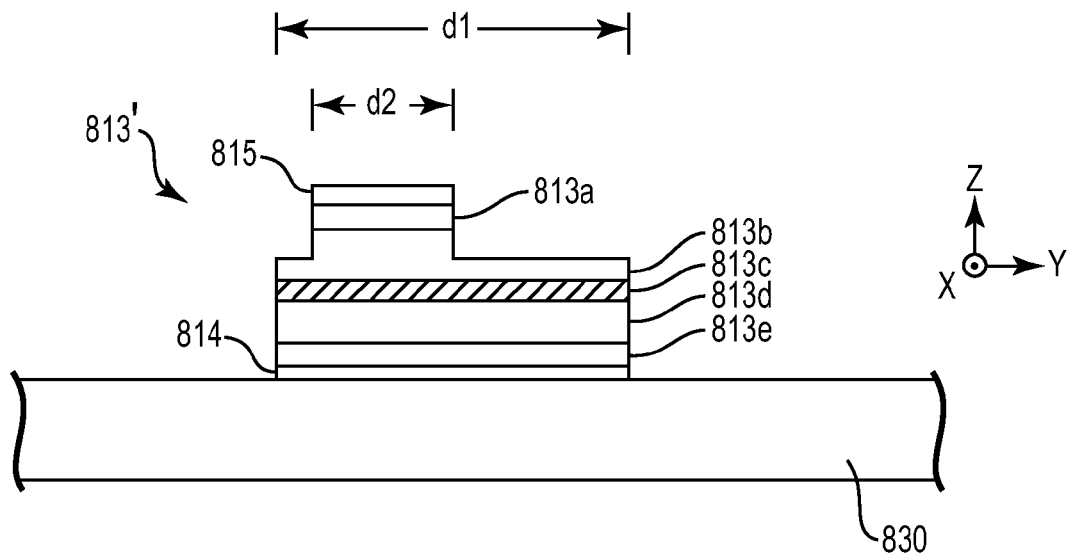
Figure 8C:
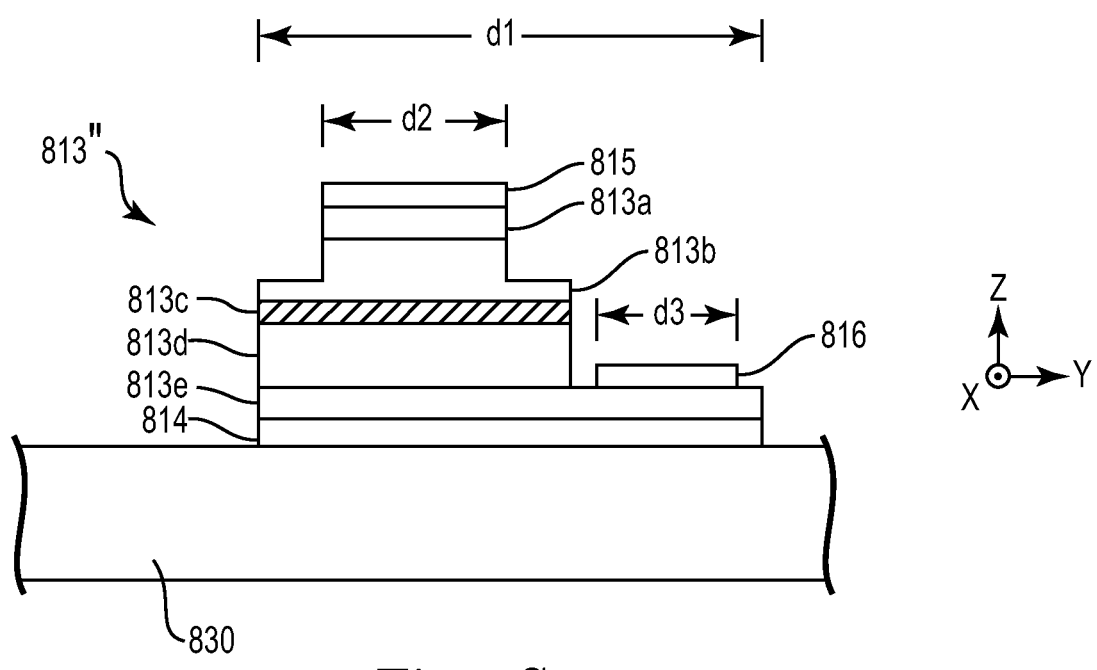

After transferring an island of epitaxial layers to the head wafer, those epitaxial layers may then be further processed e.g. using photolithographic techniques so as to form a functional semiconductor laser, which remains attached to and carried by the thick, self-supporting head substrate. Some typical processing steps that may be performed on an island of epitaxial layers are shown in FIGS. 8A through 8C. In FIG. 8A, a region or other portion of a head wafer 830, to which an island 813 of epitaxial layers has been bonded, is shown in schematic side or sectional view. The drawing is not drawn to scale, since normally the head wafer 830 would be many times thicker than the island 813. The head wafer 830 includes at least a self-supporting substrate that is incompatible with epitaxial growth of one or more of the monocrystalline layers in the island 813, and the head wafer may also contain one or more non-self-supporting thin film layers that have been, and/or will be, processed to form one or more other devices.

The island 813 of epitaxial layers, which may be the same as or similar to the islands described elsewhere herein, may contain any suitable number of layers arranged in any suitable manner. For purposes of the depicted embodiment, the island 813 is shown as having five monocrystalline semiconductor layers: an n-type cladding layer 813a which may comprise Al(x)Ga(1−x)As, an n-type guide layer 813b which may also comprise Al(x)Ga(1−x)As, an intrinsic active layer 813c which may comprise InAlGaAs, a p-type guide layer 813d which may comprise Al(x)Ga(1−x)As, and a p-type cladding layer 813e which may comprise Al(x)Ga(1−x)As. The in-plane dimension d1 of the island 813 along the y-axis may be approximately 100 micrometers. The reader will understand that the material compositions and dimensions mentioned herein are merely exemplary, and should not be construed in an unduly limiting way. An adhesive layer 814, such as Benzocyclobuene (BCB) or another suitable adhesive, bonds the island 813 to the head wafer 830. In alternative embodiments, a direct surface-to-surface bond may be employed and the adhesive layer 814 may then be omitted.

While the island 813 remains attached to the head wafer 830, a top contact 815 may be deposited on the layer 813a, and the layers 813a, 813b may be etched as shown in FIG. 8B to provide electrical current confinement in the active layer 813c. This processing of the island 813 produces a modified island 813'. The dimension d2 may be 20 micrometers. Thereafter, layers 813b, 813c, and 813d may be etched further as shown in FIG. 8C in order to expose the layer 813e, so that a bottom contact 816 can be deposited on the layer 813e. The dimension d3 may be 40 micrometers. The top and bottom contacts 815, 816 allow electrical current to be supplied to energize the semiconductor laser that is formed by the island 813 of layers after processing is complete. The resulting modified island 813" shown in FIG. 8C may represent a finished semiconductor laser that emits light parallel to the x-axis from an output facet that is oriented parallel to the y-z plane. In that regard, note that FIGS. 8A through 8C show the processing of the island 813 as viewed from a particular y-z plane. The island 813 (both in its original form and as modified by processing) is a 3-dimensional structure, thus, and the reader will understand that processing also occurs that is not apparent from FIGS. 8A through 8C. Such processing will be apparent from other figures and descriptions herein. In some cases, the processing of island 813 may produce an etched output facet for the semiconductor laser represented by the processed island 813".

In an alternative approach to that just described in connection with FIGS. 8A-8C, some or all of the processing steps used to convert the original island 813 of epitaxial layers to a fully functional semiconductor laser (e.g., modified island 813") can be performed while the island 813 is still attached to its original crystalline growth substrate, rather than after transfer of the island to the head wafer. In such cases, the island is separated from the growth substrate (laser substrate) and transferred to the head wafer or head substrate after the island has been partially or completely processed into a semiconductor laser. If needed, additional processing may then be carried out while the partially- or fully-processed island (e.g., island 813' or island 813") is attached to the head wafer or substrate.

Some of the disclosed embodiments incorporate at least one waveguide in the head in addition to the semiconductor laser. The waveguide typically conveys light from the semiconductor laser to an NFT, and is typically formed from a group of thin, non-self-supporting light-transmissive layers. Coupling between the laser and the waveguide may be by any suitable technique, such as end-fire or butt-coupling. From a processing standpoint, the waveguide may be completely formed on the head substrate before the island of epitaxial layers is transferred to the head substrate, or the waveguide may be completely formed after the island of epitaxial layers is transferred to the head substrate, or the waveguide may be formed in part before the island is transferred to the head substrate, and in part after the island is transferred.

Figure 9:
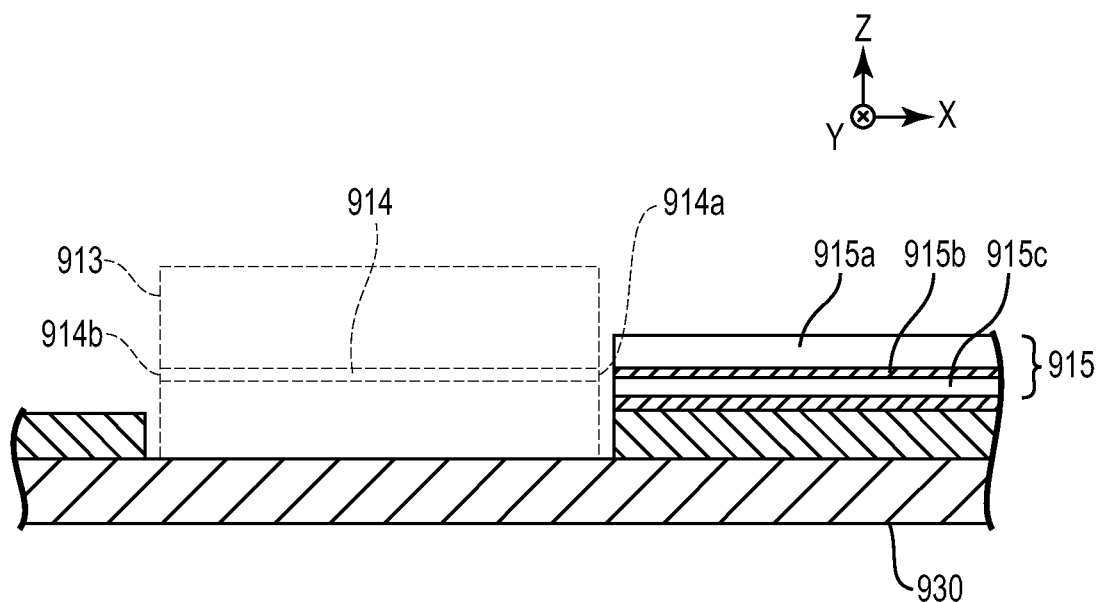
FIG. 9 is a schematic side or sectional view of a portion of a head, or of a wafer article used for making a head, that includes a semiconductor laser in combination with a waveguide.

FIG. 9 is a schematic side or sectional view of a portion of a head, or of a wafer article used for making a head, that includes a semiconductor laser 913 in combination with a waveguide 915, the laser and waveguide being attached to and carried by a self-supporting substrate 930. The laser 913 may be the same as or similar to the laser represented by the processed island 813" (FIG. 8C), but FIG. 9 shows the laser (schematically) in the x-z plane rather than in the y-z plane. The laser 913 has an active layer 914, which may be the same as or similar to active layer 813c of FIG. 8C. The active layer 914 extends along the x-axis, and terminates on both ends at etched facets 914a, 914b. Laser light is emitted from the facet 914a into the waveguide 915 by end-fire coupling. The waveguide 915 comprises a high refractive index core layer 915b sandwiched between lower refractive index cladding layers 915a, 915c. The core and cladding layers may be or comprise $Ta_2O_5$ and $Al_2O_3$, respectively, or other suitable light-transmissive materials. The waveguide 915 may be completely formed as shown before the laser 913, or before its precursor island of epitaxial layers (e.g., 813 or 813') is transferred to the substrate 930. Alternatively, the waveguide 915 may be formed in whole or in part after the laser 913 or its precursor island of layers is transferred to the substrate. Note that although FIG. 9 shows a gap between the output facet 914a and the waveguide, that gap may be filled with an index-matching material or other suitable light-transmissive material to avoid air/surface reflections and increase efficiency.

Figure 10A:
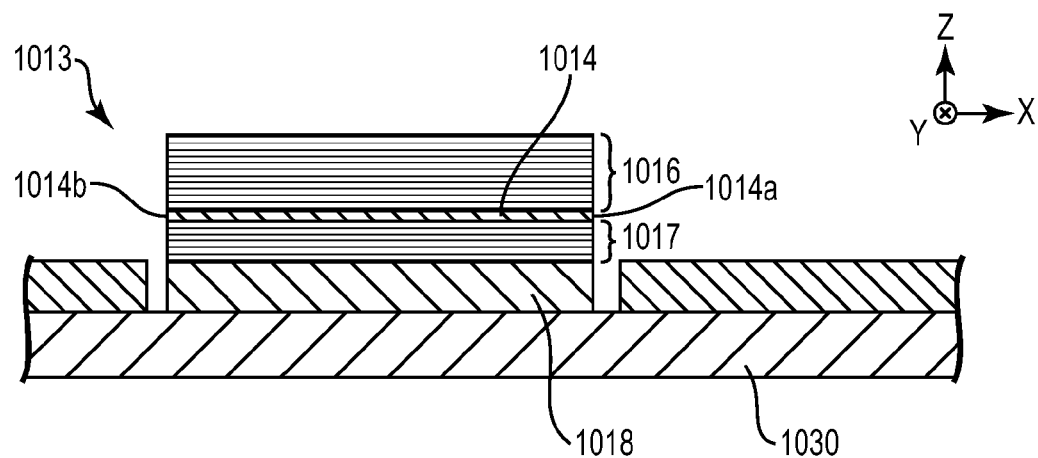
FIGS. 10A and 10B are schematic side or sectional views of a portion of another head, or of another wafer article used for making a head, that includes another semiconductor laser with an etched light-emitting surface in combination with a light guide formed after the formation of the laser.
Figure 10B:
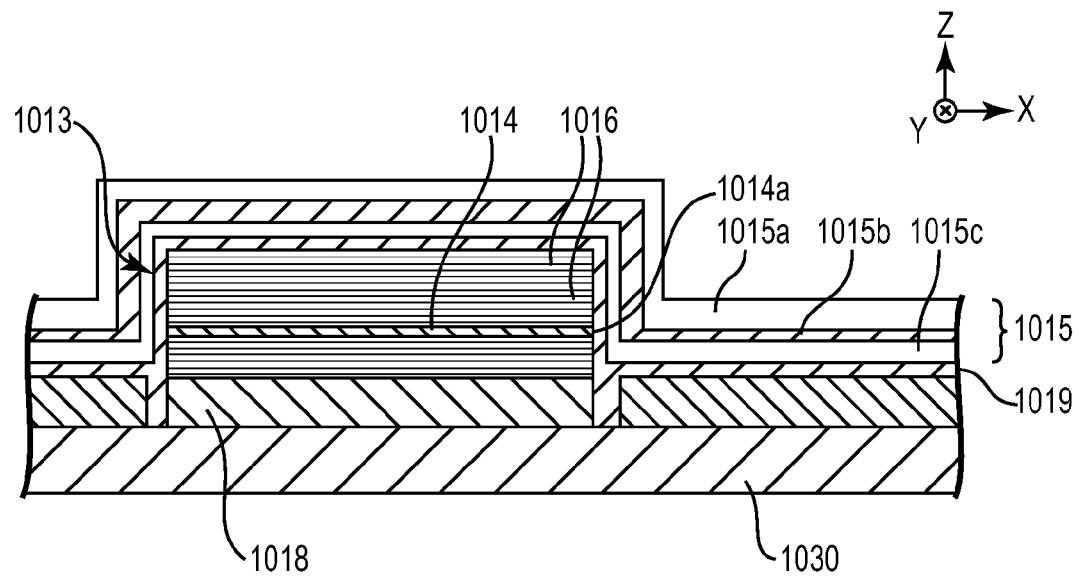

FIGS. 10A and 10B show an example of a waveguide that is fabricated after forming the laser on the head wafer. Thus in FIG. 10A, a portion of a head, or of a wafer article used for making a head, includes a semiconductor laser 1013 bonded to a head wafer or head substrate 1030. An adhesive layer 1018 (such as BCB) may bond the laser to the substrate 1030, or the adhesive layer may be omitted and direct surface-to-surface bonding may be used. The laser 1013 may be the same as or similar to other semiconductor lasers described herein, hence, it may comprise at least one monocrystalline layer that is incompatible with epitaxial growth on the substrate 1030 and is not supported by or attached to its original growth substrate. The laser 1013 includes an active layer 1014 sandwiched between additional thin layers 1016, 1017, some or all of which are typically monocrystalline and composed of semiconductors. The active layer 1014 extends along the x-axis and terminates on both ends at etched facets 1014a, 1014b. Laser light is emitted from at least the facet 1014a. After the laser 1013 is bonded in place on the substrate 1030, a sequence of thin light-transmissive layers including layers 1015c, 1015b, 1015a are deposited on the structure, both on the laser 1013 and on neighboring areas of the substrate 1030. The layers 1015a, 1015b, 1015c form a waveguide whose elevation along the z-axis is tailored to provide efficient endfire coupling from the output facet 1014a of the laser to the waveguide. The layer 1015b may operate as a core and comprise relatively high refractive index material, and the layers 1015a, 1015c may operate as cladding layers and may comprise lower refractive index materials. An additional layer 1019 may be deposited before the layers 1015a, 1015b, 1015c and may provide index matching between the laser and the waveguide.

The foregoing teachings can be implemented to provide a wide variety of different semiconductor laser designs and a wide variety of different layouts of semiconductor lasers, waveguides, and NFTs on a recording head or other article. FIGS. 11 through 22 show in schematic form some representative examples. In each of these figures at least one laser is depicted, and the laser is assumed to be a semiconductor laser whose fabrication and design are consistent with the teachings herein. Each laser is assumed to be attached to and carried by a self-supporting head substrate, and the laser is assumed to be formed by one or more thin layers that are not self-supporting. Each of the lasers is also assumed to include at least one thin mono crystalline (epitaxial) layer, and typically a stack of such layers, that is or are incompatible with epitaxial growth on the head substrate and not supported by or attached to its or their original growth substrate. Cartesian x-y-z coordinates are provided in FIGS. 11-22 for reference, the coordinates being consistent with the coordinate systems provided for head 418 (FIG. 5) and for head 518 (FIG. 5A). For example, the heads in each of FIGS. 11 through 22 include an NFT that is disposed at or near an outer surface (which may be an air-bearing surface) of the head, the outer surface being oriented generally parallel to the y-z plane. The heads depicted in FIGS. 11-22 are also assumed to include other thin layers that are fashioned to form one or more other devices, such as at least the write pole of a magnetic write element. Such a write pole would normally be disposed near the NFT, as explained in connection with at least FIGS. 5 and 5A. One or more magnetic write elements, magnetic read elements, and electromagnet coils are examples of additional devices that may be incorporated into the heads of FIGS. 11-22.

Figure 11:
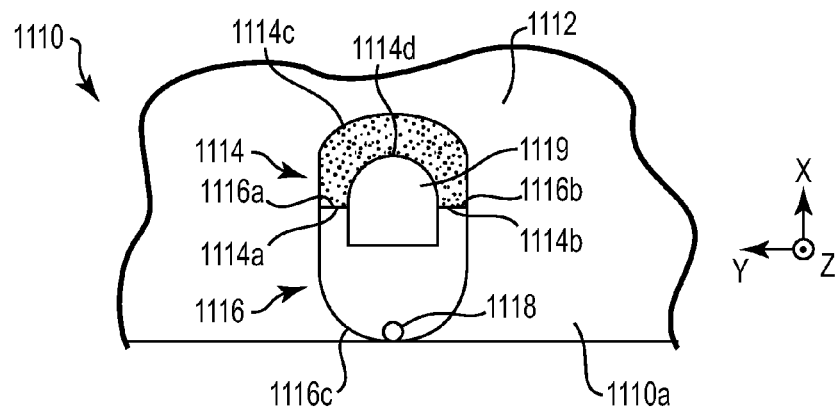
FIG. 11 is a schematic plan or sectional view of a portion of a head showing a semiconductor laser, waveguide, NFT, and air-bearing surface.

Turning then to FIG. 11, a head 1110 is shown that includes a head substrate or wafer 1112 on which a semiconductor laser 1114, a waveguide 1116, and an NFT 1118 are disposed. The head includes an outer surface 1110a, which may be configured as an air bearing surface. The laser is oriented to emit light from etched output facets 1114a, 1114b into corresponding input ends 1116a, 1116b of the waveguide, and the waveguide conveys and focuses the laser light to a distal end 1116c of the waveguide, at which the NFT 1118 is located.

The cavity of the laser 1114 is bounded by two curved facets 1114c, 1114d, which may be patterned on the head by etching. Electrical contacts are used to pass current through the active region of the laser 1114. The waveguide 1116 may correspond to portions of the laser epitaxial stack that are not electrically contacted, i.e., through which electrical current does not pass. Alternatively, the waveguide 1116 may be fabricated from different layers and different materials than the laser 1114. In this case, the active region of the laser 1114 and the waveguide 1116 would be fabricated in a separate series of steps.

If desired, the curved facets 1114c, 1114d can be made straight (parallel to the surface 1110a), or angled or double angled to reflect light back into the active cavity of the laser 1114 in the same or similar way as the curved facets 1114c, 1114d. Further, a central inactive region 1119 may be made active to increase the active area of the laser 1114.

Figure 12:
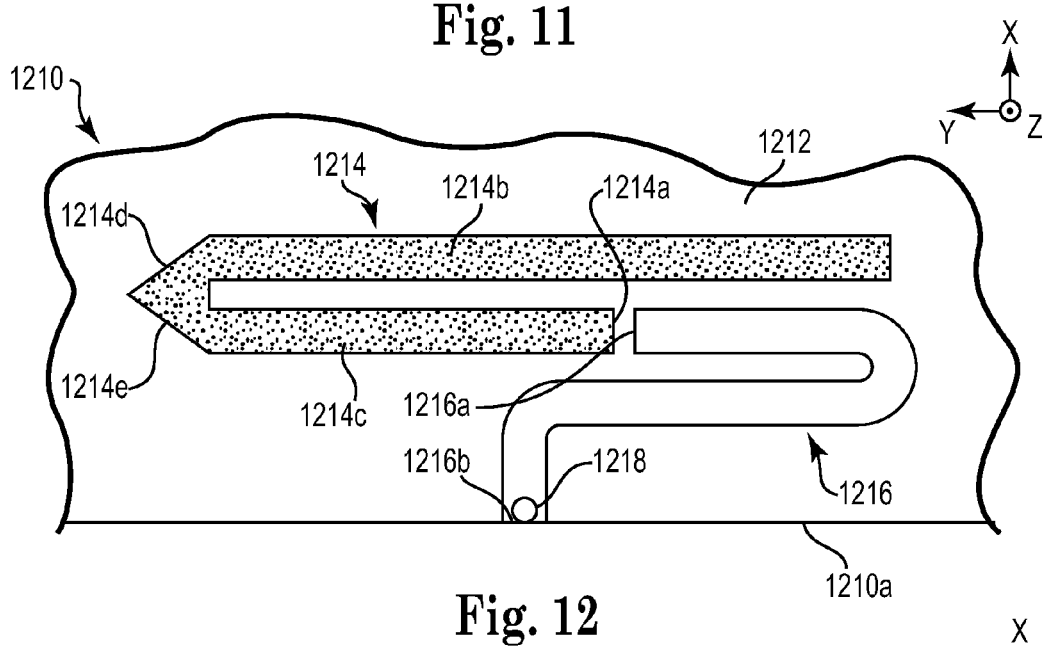
FIGS. 12 through 15 are schematic plan or sectional views of portions of other heads that each include a semiconductor laser, waveguide, NFT, and air-bearing surface.

In FIG. 12, a head 1210 includes a head substrate or wafer 1212 on which a semiconductor laser 1214, a waveguide 1216, and an NFT 1218 are disposed. The head includes an outer surface 1210a, which may be configured as an air bearing surface. The laser is oriented to emit light from an etched output facet 1214a into an input end 1216a of the waveguide, and the waveguide conveys the laser light to a distal end 1216b of the waveguide, at which the NFT 1218 is located.

The laser 1214 includes distinct sections 1214b, 1214c coupled to each other by reflective facets 1214d, 1214e. These facets may be described as being retroreflective, since they are arranged to reflect light propagating in an initial direction (e.g. along the positive y-axis) so the reflected light propagates in the opposite direction (e.g. along the negative y-axis).

The serpentine shape of laser 1214 may be chosen in order to provide a relatively long active cavity length that fits into a limited available space on the head 1210. In the active region of the laser 1214, light in the section 1214b is reflected by the inclined (e.g. 45 degree) etched facets 1214d, 1214e, which direct the light into the section 1214c. This can allow the active region of the laser to be effectively longer than would otherwise be able to fit on the head 1210, which may enhance the output power of the laser, as well as efficiency and reliability. The etched output facet 1214a at the end of the laser cavity may butt-couple to the waveguide 1216. The waveguide 1216 may be patterned to have one or more curves or bends as shown so as to deliver the laser light to the NFT 1218 in a space-efficient manner. A spacing or gap can be patterned between the laser 1214 and waveguide 1216, and the gap may then be filled with an appropriate index matching material to minimize reflection losses and facilitate coupling.

Figure 13:
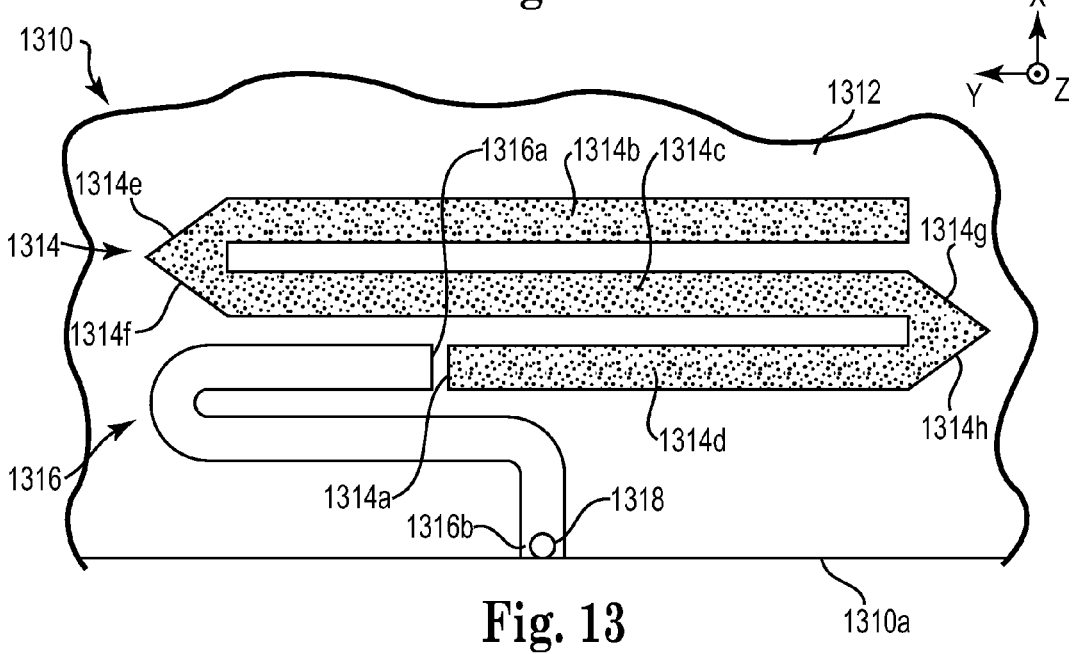

In FIG. 13, a head 1310 includes a head substrate or wafer 1312 on which a semiconductor laser 1314, a waveguide 1316, and an NFT 1318 are disposed. The head includes an outer surface 1310a, which may be configured as an air bearing surface. The laser is oriented to emit light from an etched output facet 1314a into an input end 1316a of the waveguide, and the waveguide conveys the laser light to a distal end 1316b of the waveguide, at which the NFT 1318 is located. The laser 1314 includes distinct sections 1314b, 1314c, 1314d coupled to each other by reflective facets 1314e, 1314f, 1314g, 1314h. These facets may be described as being retroreflective, since they are arranged to reflect light propagating in an initial direction (e.g. along the positive y-axis) so the reflected light propagates in the opposite direction (e.g. along the negative y-axis).

Similar to FIG. 12, the serpentine shape of laser 1314 may be chosen in order to provide a relatively long active cavity length that fits into a limited available space on the head 1310. The active cavity of laser 1314 is designed to meander (i.e., wind back and forth) even more than laser 1214 (FIG. 12), such that its effective cavity length can be made several times that of laser 1214, and several times the length of a conventional semiconductor laser that does not utilize any retroreflective facets. This again may be used to provide higher efficiency per unit of input power.

Figure 14:
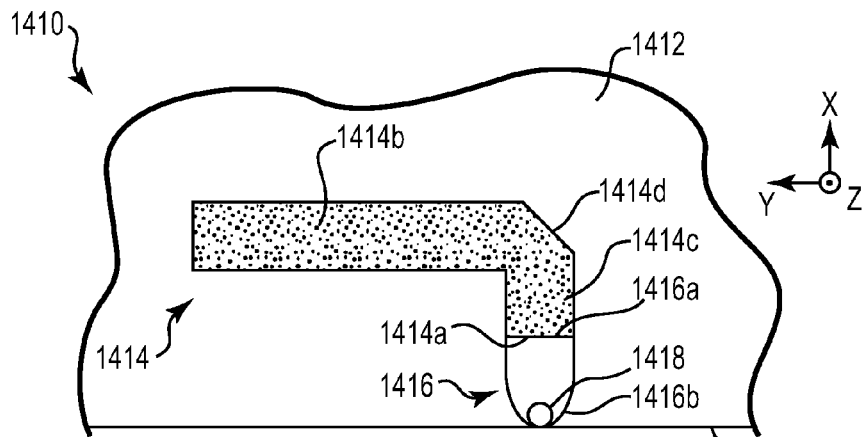

In FIG. 14, a head 1410 includes a head substrate or wafer 1412 on which a semiconductor laser 1414, a waveguide 1416, and an NFT 1418 are disposed. The head includes an outer surface 1410a, which may be configured as an air bearing surface. The laser is oriented to emit light from an etched output facet 1414a into an input end 1416a of the waveguide, and the waveguide conveys and focuses the laser light to a distal end 1416b of the waveguide, at which the NFT 1418 is located. The laser 1414 includes distinct sections 1414b, 1414c coupled to each other by a reflective facet 1414d. The sections 1414b, 1414c may be oriented perpendicularly or at another desired angle relative to each other. The angled nature of the two laser sections allow the laser 1414 to have an increased path length and increased output power relative to a conventional laser cavity design. Just as in the configurations of FIGS. 12 and 13, this may be useful in cases where "real estate" or design space on a recording head is limited in size and/or shape.

Figure 15:
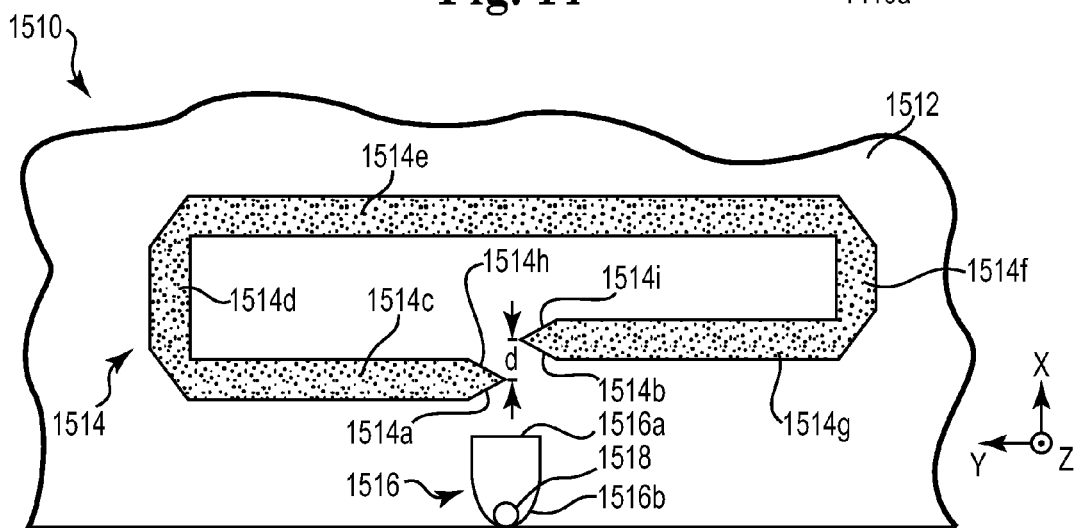

In FIG. 15, a head 1510 includes a head substrate or wafer 1512 on which a semiconductor laser 1514, a waveguide 1516, and an NFT 1518 are disposed. The head includes an outer surface 1510a, which may be configured as an air bearing surface. The laser is oriented to emit light from etched output facets 1514a, 1514b into an input end 1516a of the waveguide, and the waveguide conveys and focuses the laser light to a distal end 1516b of the waveguide, at which the NFT 1518 is located. The laser 1514 includes distinct sections 1514c, 1514d, 1514e, 1514f, 1514g coupled to each other by numerous reflective (etched) facets as shown, including reflective facets 1514h and 1514i. Each of the sections 1514c, 1514d, etc. is oriented perpendicular to at least one section, and parallel to at least another section. The output facets 1514a, 1514b may be partially reflecting, such that the facet pair 1514a, 1514h, and the facet pair 1514b, 1514i operate to retroreflect some laser light back into the laser cavity.

The output facets 1514a, 1514b may be displaced from each other (as measured along the x-axis) by a distance d as shown. This displacement can be used to introduce a phase shift between laser light injected into the waveguide 1516 from facet 1514a relative to laser light injected into the waveguide from facet 1514b. By appropriate selection of the displacement distance d, the phase of the laser light incident on the waveguide, and incident on the NFT 1516b, can be controlled. This can be desirable because some NFTs work optimally when illuminated with light incident on one side that is phase shifted by 180 degrees relative to light incident on the other side of the NFT. For an NFT 1518 designed for a 180 degree phase shift, the distance d can be made to be one-half the operating wavelength of the laser 1514. Nonzero phase shifts between two laser output beams can also be desirable in optical magnetic recording applications.

Just as in the configurations of FIGS. 12, 13, and 14 the coiled or bent shape of the laser 1514 may be useful in cases where real estate or design space on a recording head is limited in size and/or shape.

Figure 16:
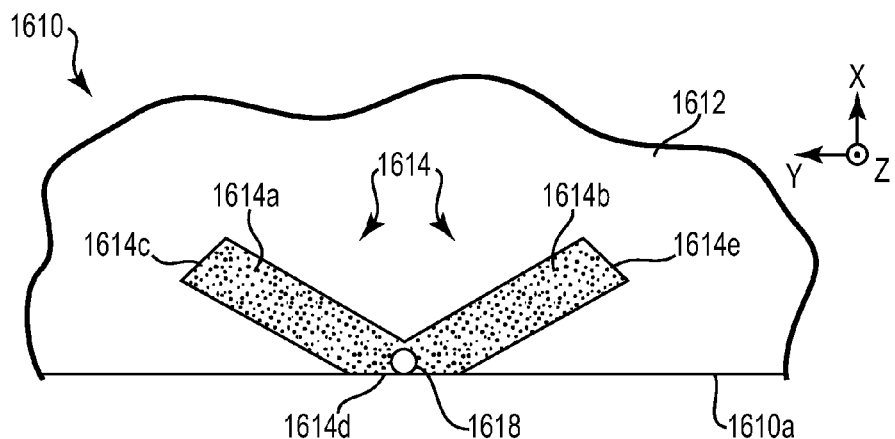
FIGS. 16 and 18 are schematic plan or sectional views of portions of other heads that each include a semiconductor laser, NFT, and air-bearing surface.

In FIG. 16, a head 1610 includes a head substrate or wafer 1612 on which a semiconductor laser 1614 and an NFT 1618 are disposed. Note that the head 1610 does not include or rely on a waveguide to conduct light from the laser to the NFT. The head includes an outer surface 1610a, which may be configured as an air bearing surface. The laser comprises two distinct sections 1614a, 1614b, each of which may deliver laser light directly to the NFT 1618. The laser 1614 includes reflective etched facets 1614c, 1614e. The laser 1614 also includes etched facet 1614d, which may be fully or partially reflective. The sections 1614a, 1614b may extend along axes that each make an angle theta with the facet 1614d, and theta may be 45 degrees or another desired value. In some cases, the lengths of the sections 1614a, 1614b may be made different so as to control the relative phase of laser light delivered by the different sections. The NFT should be in close contact with the active region of the laser 1614 to ensure sufficient coupling of laser light to the NFT.

The V-shaped design of laser 1614 is characterized by a substantial absence of the active region of the laser in the vicinity of a central axis of the head 1610 (consider e.g. a central axis that is parallel to the x-axis but passes through the NFT 1618). This design feature may be used to allow a magnetic write pole or write element to be fabricated in this central vicinity.

Figure 17:
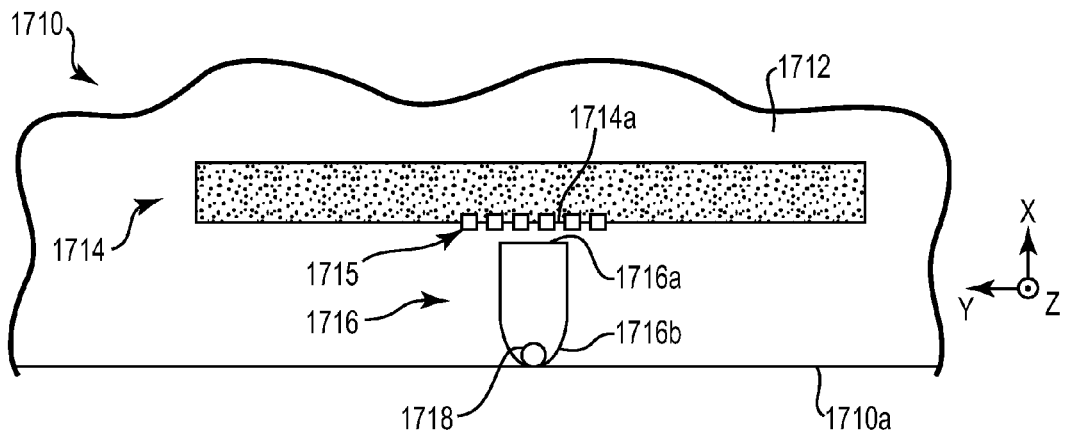
FIGS. 17, and 19 through 22, are schematic plan or sectional views of portions of other heads that each include a semiconductor laser, waveguide, NFT, and air-bearing surface.

In FIG. 17, a head 1710 includes a head substrate or wafer 1712 on which a semiconductor laser 1714, a waveguide 1716, and an NFT 1718 are disposed. The head includes an outer surface 1710a, which may be configured as an air bearing surface. The laser is oriented to emit light from etched output facet 1714a, in which a patterned grating 1715 has been formed, into an input end 1716a of the waveguide, and the waveguide conveys and focuses the laser light to a distal end 1716b of the waveguide, at which the NFT 1718 is located.

The grating 1715 is patterned into the facet 1714a of the laser 1714 with a period suitable for the wavelength of light at which the laser operates. Light incident on the grating from the active laser is redirected or coupled into the waveguide 1716. The coupling efficiency of light from the laser cavity to the waveguide depends on the depth of the grating (distance of protrusion into the laser cavity) and the length of the grating. The depth and length parameters should be selected to provide a balance of adequate coupling to the waveguide with acceptable levels of loss. If the grating 1715 is too long or protrudes too far into the laser cavity, cavity losses may become unacceptably high, and the light amplification process in the laser will be adversely affected. If the grating is not deep enough or is too short, insufficient light may be coupled to the waveguide 1716.

The etched end facets 1714b, 1714c of the laser 1714 may be fully reflective, for high efficiency operation. If desired, retroreflective facet pairs such as facet pair 1514a, 1514h, may also be used at one or both ends of the laser 1714.

Figure 18:
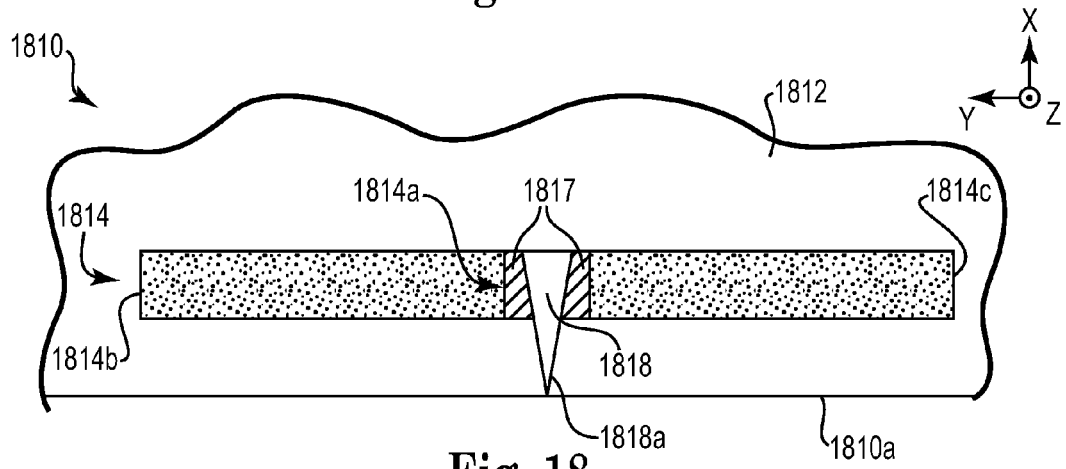

In FIG. 18, a head 1810 includes a head substrate or wafer 1812 on which a semiconductor laser 1814 and an NFT 1818 are disposed. The head includes an outer surface 1810a, which may be configured as an air bearing surface. The laser 1814 includes a central portion 1814a and etched end facets 1814b, 1814c. The facets 1814a, 1814b may be fully reflective. In the central portion 1814a of the active region of the laser 1814, laser light is coupled out of the laser with a plasmonic grating 1817 to impinge on the NFT 1818, a terminal end 1818a of which is located at the surface 1810a.

The laser 1814 may be an edge emitting laser with a rectangular cavity. A small portion 1814a of the laser cavity is patterned with a plasmonic grating, coupled to the NFT 1818. An upper portion of the NFT 1818, opposite the end 1818a, may also be considered to be a plasmonic waveguide. Laser light is coupled from the laser cavity to the upper portion of the NFT 1818 with minimal disruption of the laser cavity. The plasmonic waveguide is designed to transport light from the grating, along a tapered waveguide cross-section, to the NFT terminus 1818a at the surface 1810a.

The plasmonic grating may be designed for optimal coupling from the laser 1814 to the NFT 1818 at the laser wavelength. This is fulfilled when the period of the grating satisfies the condition $\beta=k^*\sin(\Theta \pm v^*g)$, where $v=2\pi/a$, a=the grating period of the plasmonic grating, $k=2\pi/\lambda$, $\lambda$=the wavelength of the laser light, $\beta=(2\pi/\lambda)(\in 1^* \in 2)/(\in 1+\in 2))$, $\in 1$=the permittivity of the metal (of which the NFT is composed), $\in 2$=the permittivity of the dielectric that the NFT is in contact with, $\Theta$=the angle of incidence of the light on the grating, with respect to the y-axis, and g=the distance between peaks or troughs of the grating. When the wavelength of the incident laser light satisfies this condition, light is coupled out of the laser 1814 into the grating, a surface plasmon is excited at the metal-dielectric interface of the NFT 1818, and the surface Plasmon propagates along the NFT to the terminus 1818a.

The cavity of the laser 1814 should be designed to operate in transverse magnetic mode in order for efficient coupling to occur between the laser cavity and the plasmonic grating 1817. If desired, the laser 1814 can be modified to have retroflective facets in order to fit within a limited space of the head 1810. Of course, design features of other semiconductor lasers and heads and lasers can also be used, with appropriate modifications if needed.

Figure 19:
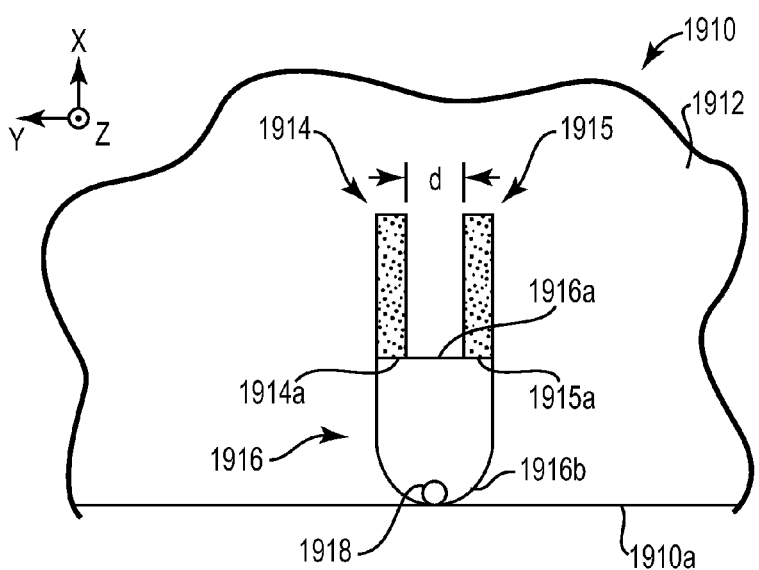

In FIG. 19, a head 1910 includes a head substrate or wafer 1912 on which two semiconductor lasers 1914, 1915, a waveguide 1916, and an NFT 1918 are disposed. The head includes an outer surface 1910a, which may be configured as an air bearing surface. The lasers are oriented to emit light from their respective etched output facets 1914a, 1915a into an input end 1916a of the waveguide, and the waveguide conveys and focuses the laser light to a distal end 1916b of the waveguide, at which the NFT 1918 is located.

In some cases, laser light incident on the NFT 1918 may be polarized in the plane of the waveguide (i.e., in the x-y plane of FIG. 19) to provide optimal coupling between the laser light and the NFT. In such cases, transducer operation is optimal when the light incident from each side of the parabolic waveguide 1916 is 180 degrees out of phase. In order to achieve such a phase shift, the cavities of the two lasers 1914, 1915 may be separated by a distance d that is small enough so that the lasers are coupled together. Evanescent coupling between the laser modes in the cavities can be used to provide a 180 degree phase shift between the two laser cavities, which in turn provides a 180 degree phase difference between the laser light emitted from the lasers 1914, 1915.

Figure 20:
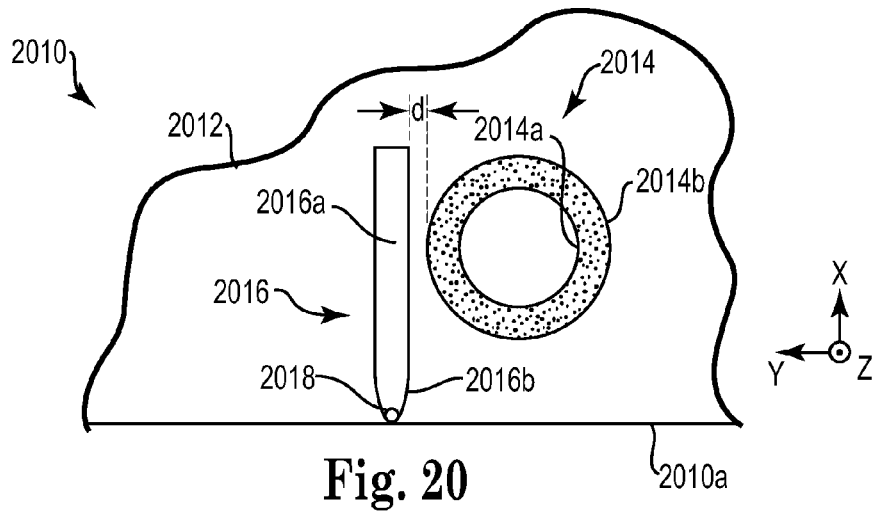
Figure 21:
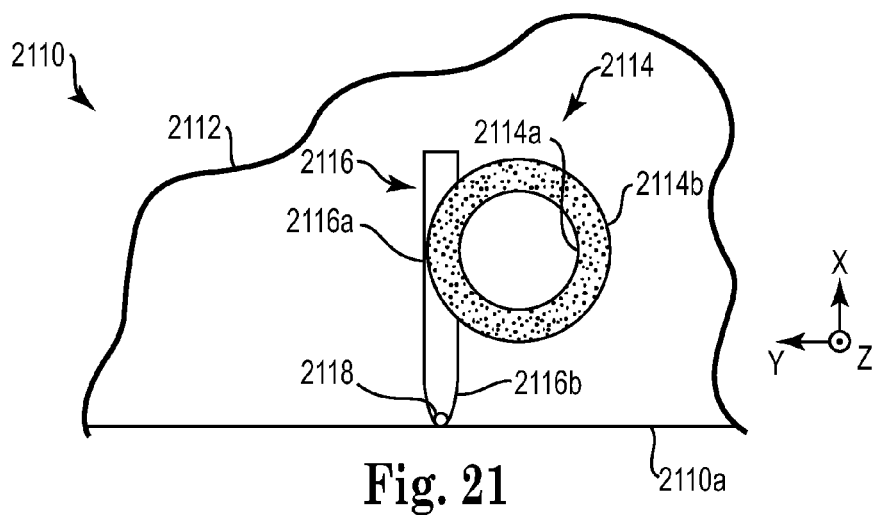
Figure 22:
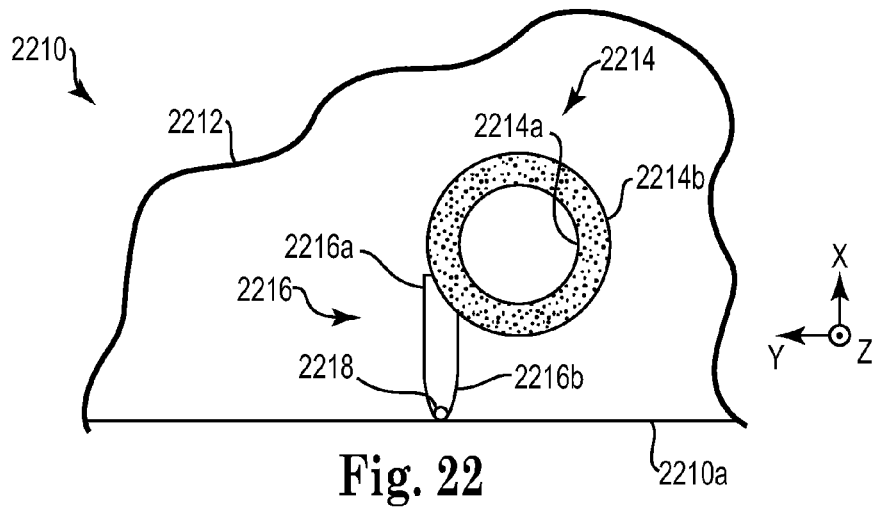

FIGS. 20, 21, and 22 depict heads that incorporate semiconductor lasers shaped in the form of a ring, i.e., ring lasers. Ring lasers do not require a distinct output facet to operate, and they can be fabricated to be compact. Some type of coupling, however, is used to deliver laser light from the semiconductor laser to the NFT.

In FIG. 20, a head 2010 includes a head substrate or wafer 2012 on which a semiconductor laser 2014, a waveguide 2016, and an NFT 2018 are disposed. The head includes an outer surface 2010a, which may be configured as an air bearing surface. The laser is configured as a ring laser, with an inner and outer etched surface 2014a, 2014b. Due to the placement of the laser 2014 relative to the waveguide 2016, laser light is coupled from the laser to an input end 2016a of the waveguide, and the waveguide conveys and focuses the laser light to a distal end 2016b of the waveguide, at which the NFT 2018 is located.

The laser light is coupled evanescently from the laser 2014 to the waveguide 2016. The efficiency of such coupling increases as the distance d between the laser and waveguide decreases. The distance, d, is typically in a range from 50 to 500 nanometers. The performance of the ring laser depends on its radius, which is typically in a range from 10 to 100 micrometers.

In FIG. 21, a head 2110 includes a head substrate or wafer 2112 on which a semiconductor laser 2114, a waveguide 2116, and an NFT 2118 are disposed. The head includes an outer surface 2110a, which may be configured as an air bearing surface. The laser is configured as a ring laser, with an inner and outer etched surface 2114a, 2114b. Due to the placement of the laser 2114 relative to the waveguide 2116, laser light is coupled from the laser to an input end 2116a of the waveguide, and the waveguide conveys and focuses the laser light to a distal end 2116b of the waveguide, at which the NFT 2118 is located.

In FIG. 21, laser light can again be made to evanescently couple from the laser 2114 to the waveguide 2116. In the case of head 2110, evanescent coupling occurs across a vertical gap (a gap along the z-axis) between the laser 2114 and the waveguide 2116. This arrangement differs from that of FIG. 20 insofar as the coupling distance in FIG. 21 can be controlled by thin film deposition rather than by patterning. Rather than being situated underneath the laser 2114, the waveguide 2116 may be situated over or atop the laser 2114 to facilitate better integration of the various devices in the recording head area.

In FIG. 22, a head 2210 includes a head substrate or wafer 2212 on which a semiconductor laser 2214, a waveguide 2216, and an NFT 2218 are disposed. The head includes an outer surface 2210a, which may be configured as an air bearing surface. The laser is configured as a ring laser, with an inner and outer etched surface 2214a, 2214b. Due to the placement of the laser 2214 relative to the waveguide 2216, laser light is coupled from the laser to an input end 2216a of the waveguide, and the waveguide conveys and focuses the laser light to a distal end 2216b of the waveguide, at which the NFT 2218 is located.

In FIG. 22, the ring laser 2214 forms a y-junction with the waveguide 2216. The waveguide thus directly couples laser light from the ring laser 2214. In this case, the waveguide 2216 can comprise the same layers and material as the active region of the laser 2214 to improve coupling and reduce the number of processing steps. The size of the waveguide 2216 will influence the performance and efficiency of the laser 2214 due to disturbances to the resonances in the ring laser cavity.

In summary, laser designs proposed here can be used in heads such as recording heads, and can make use of the flexibility afforded by thin film processing. The lasers can be made in shapes and sizes that fit within the size constraints of a recording head. The laser size that is typically needed for heat-assisted magnetic recording is below the size of conventional edge emitting lasers. Fabricating the laser as part of the recording head fabrication process negates the need for mechanical handling of larger sized semiconductor lasers. Photolithography and etching can also be used to pattern the laser on the head or head substrate, resulting in much greater flexibility in the overall shape and configuration of the laser, which can be used to enhance performance and efficiency.

Figure 23:
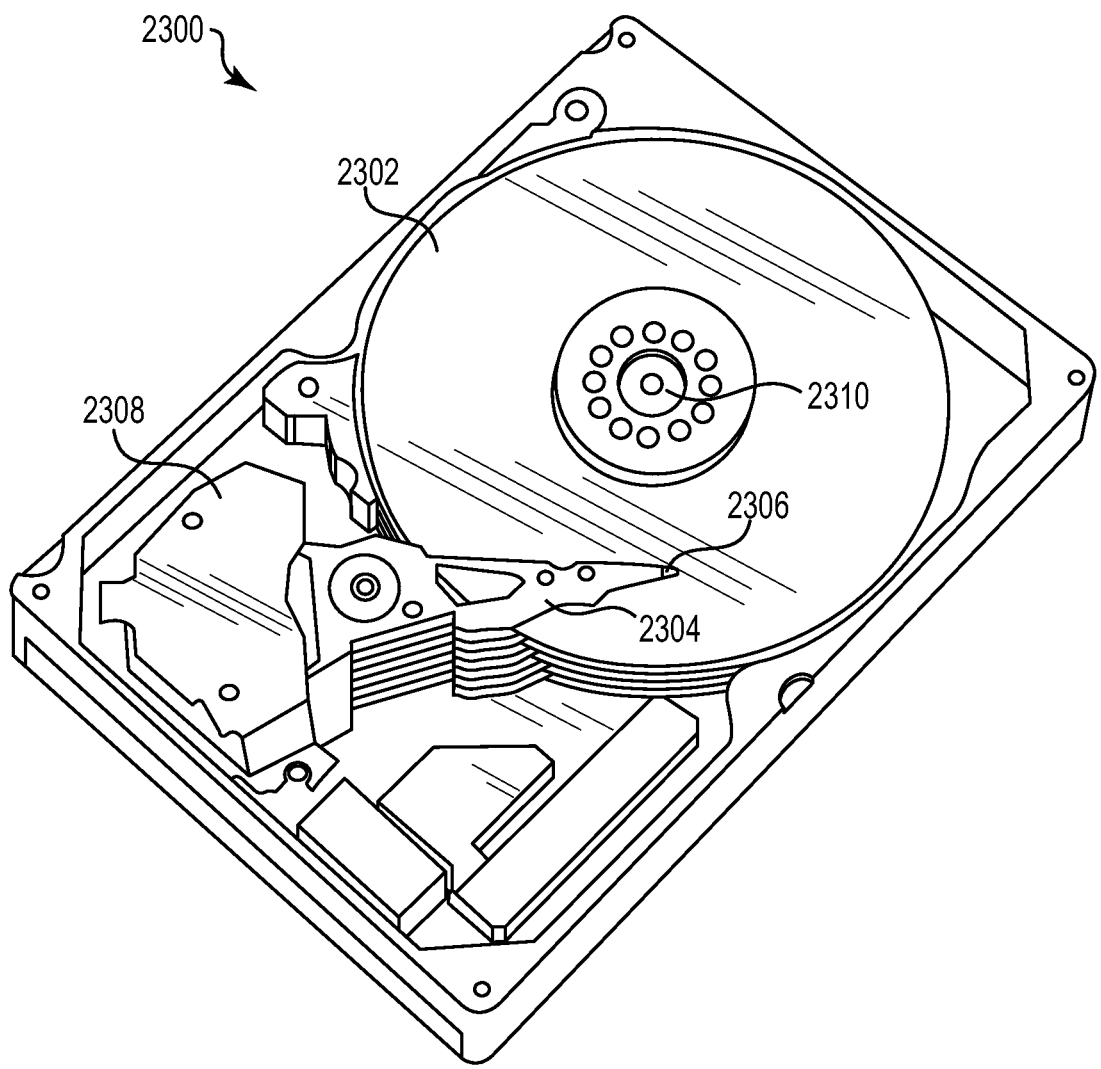
FIG. 23 is a perspective view of a hard drive apparatus.

The structures and techniques described herein may be used, for example, in read/write heads of a magnetic data storage device such as hard drive apparatus 2300 shown in FIG. 23. The apparatus 2300 generally includes at least one magnetic disk 2302 that rotates around a spindle axis 2310. The apparatus 2300 further includes an arm 2304 with an end-mounted a transducer head 2306 that is positioned over a surface of the disk while reading from or writing to the disk 2302. The arm 2304 is driven by an actuator 2308 to move radially across the disk 2302. This movement of the arm 2304 positions the transducer head 2306 over the disk 2302 to read from or write to tracks on the disk 2302. A hard drive of this type may include multiple arms 2304 and disks 2306 arranged in a stack formation, and may include transducer heads that read/write from/to both surfaces of the disks 2302.

The transducer head 2306 (also referred to as a "slider") may include both magnetic read and write elements. A read element generally operates by detecting a changing magnetic field, e.g., changes in direction of magnetic flux caused by relative motion between an encoded magnetic media and the read element. The read element converts the flux reversals into an electrical analog signal that represents data stored on the media. The write element operates in response to a current sent through a conductor surrounding a write pole, which generates a magnetic field at a tip of the write pole. This magnetic field in turns changes the orientation of a local magnetic field at the surface of the disk 2302, causing data to be persistently stored on the disk 2302.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. For example, the reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. A magnetic stack, comprising:
   one or more first layers patterned to provide a magnetic write pole;
   one or more second layers patterned to provide a semiconductor laser;
   a self-supporting substrate that carries the magnetic write pole and the laser; and
   a near field transducer (NFT) disposed to receive light generated by the laser;
   wherein at least one of the one or more second layers is mono crystalline and incompatible with epitaxial growth on the substrate; and
   wherein no support substrate other than the self-supporting substrate attaches to the one or more second layers.

2. The stack of claim 1, wherein the laser comprises at least one etched facet adapted to emit laser light generated by the laser.

3. The stack of claim 1, further comprising:
   a waveguide disposed to transmit light from the laser to the NFT.

4. The stack of claim 1, wherein the NFT is coupled to the semiconductor laser without an intervening waveguide.

5. The stack of claim 1, wherein the magnetic stack comprises an air-bearing surface, and wherein the NFT is disposed at the air-bearing surface.

6. The stack of claim 1, wherein the self-supporting substrate is composed of a material comprising aluminum oxide and titanium carbide.

7. The stack of claim 1, wherein neither the one or more first layers nor the one or more second layers are self-supporting.

8. The stack of claim 1, wherein the laser comprises distinct first and second sections coupled to each other by at least one reflective facet.

9. The stack of claim 8, wherein the distinct first and second sections are parallel to each other.

10. The stack of claim 8, wherein the distinct first and second sections are perpendicular to each other.

11. The stack of claim 1, wherein the laser comprises a ring laser.

12. An article, comprising:
    a self-supporting wafer substrate having a plurality of non-self-supporting layers formed thereon, the plurality of non-self-supporting layers comprising one or more first layers and one or more second layers;
    multiple write pole structures formed by the one or more first layers in corresponding multiple regions of the wafer; and
    at least one semiconductor laser formed by the one or more second layers in each of the multiple regions of the wafer;
    wherein at least one of the one or more second layers is mono crystalline and incompatible with epitaxial growth on the wafer substrate.

13. The article of claim 12, wherein no support substrate other than the wafer substrate attaches to the one or more second layers.

14. The article of claim 12, wherein each of the semiconductor lasers includes at least one etched light-emitting facet.

15. The article of claim 12, wherein each region of the wafer also includes a near-field transducer (NFT) disposed to receive light emitted by the semiconductor laser.

16. The article of claim 15, wherein each region of the wafer also includes a waveguide disposed to transmit light from the semiconductor laser to the NFT.

17. The article of claim 15, wherein for each region of the wafer, the NFT is coupled to the semiconductor laser without an intervening waveguide.

18. A method of making a device, comprising:
    providing a first wafer comprising a first self-supporting wafer substrate;
    forming a write pole structure on the first wafer;
    providing a second self-supporting wafer comprising a monocrystalline wafer substrate and an epitaxial layer compatible with epitaxial growth on the monocrystalline wafer substrate;
    transferring at least a portion of the epitaxial layer from the monocrystalline wafer substrate to the first wafer substrate to produce a structure in which the at least a portion of the epitaxial layer is attached to the first wafer substrate but not attached to the monocrystalline wafer substrate; and
    forming a semiconductor laser on the first wafer substrate utilizing the at least a portion of the epitaxial layer.

19. The method of claim 18, wherein the epitaxial layer is part of an epitaxial layer stack on the monocrystalline wafer substrate, and wherein the transferring comprises transferring at least a portion of the epitaxial layer stack from the monocrystalline wafer substrate to the first wafer substrate to produce a structure in which the at least a portion of the epitaxial layer stack is attached to the first wafer substrate but not attached to the monocrystalline wafer substrate.

20. The method of claim 19, wherein the forming the semiconductor laser comprises patterning the at least a portion of the epitaxial layer stack by etching.

21. The method of claim 19, further comprising forming a light-emitting facet in the epitaxial layer stack by etching before the transferring.

22. The method of claim 18, wherein the transferring comprises transferring islands of the epitaxial layer to the first wafer substrate.

23. The method of claim 18, wherein forming the write pole structure comprises forming multiple write pole structures in corresponding multiple regions of the first wafer, and wherein forming the semiconductor laser comprises forming a semiconductor laser in each of the multiple regions of the first wafer utilizing the epitaxial layer, the method further comprising:
   forming a near-field transducer (NFT) in each of the multiple regions on the first wafer substrate.

* * * * *